United States Patent
Ueda et al.

(10) Patent No.: US 11,225,249 B2
(45) Date of Patent: *Jan. 18, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yugo Ueda, Wako (JP); Akihiro Toda, Wako (JP); Dan Umeda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 248 days.

This patent is subject to a terminal disclaimer.

(21) Appl. No.: 16/296,333

(22) Filed: Mar. 8, 2019

(65) Prior Publication Data

US 2019/0283751 A1 Sep. 19, 2019

(30) Foreign Application Priority Data

Mar. 15, 2018 (JP) .............................. JP2018-047996

(51) Int. Cl.
*B60W 30/16* (2020.01)
*B60W 10/20* (2006.01)
(Continued)

(52) U.S. Cl.
CPC ............ *B60W 30/16* (2013.01); *B60W 10/04* (2013.01); *B60W 10/20* (2013.01); *B60W 40/04* (2013.01);
(Continued)

(58) Field of Classification Search
CPC ...... B60W 30/16; B60W 10/20; B60W 10/04; B60W 40/04; B60W 2420/42;
(Continued)

(56) References Cited

U.S. PATENT DOCUMENTS

2015/0117715 A1* 4/2015 Murao ..................... G06K 9/38
382/104
2016/0114800 A1* 4/2016 Shimizu .......... B60W 30/18154
701/70

FOREIGN PATENT DOCUMENTS

JP  2005-165555  6/2005
JP  2010-083314  4/2010

OTHER PUBLICATIONS

Japanese Office Action for Japanese Patent Application No. 2018-047996 dated Oct. 12, 2021.

* cited by examiner

*Primary Examiner* — Rodney A Butler
(74) *Attorney, Agent, or Firm* — Amin, Turocy & Watson, LLP

(57) ABSTRACT

A vehicle control device includes a recognizer that is configured to recognize an object around a subject vehicle, a driving controller that is configured to control a speed or steering of the subject vehicle, and a predictor that is configured to predict that a predetermined vehicle will move to a front of the subject vehicle on a subject lane. The driving controller is configured to perform a behavior control in a case where it is predicted that the predetermined vehicle will move to the front of the subject vehicle on the subject lane and limits the vehicle behavior control in a case where it is predicted that the predetermined vehicle does not move to the front of the subject vehicle on the subject lane as compared with a case where it is predicted that the vehicle will move to the front of the subject vehicle on the subject lane.

13 Claims, 13 Drawing Sheets

(51) Int. Cl.
*B60W 10/04* (2006.01)
*G08G 1/16* (2006.01)
*B60W 40/04* (2006.01)

(52) U.S. Cl.
CPC ............. *G08G 1/166* (2013.01); *G08G 1/167* (2013.01); *B60W 2420/42* (2013.01); *B60W 2420/52* (2013.01)

(58) Field of Classification Search
CPC ....... B60W 2420/52; B60W 2554/402; B60W 2552/00; B60W 2552/10; B60W 60/0015; B60W 60/001; B60W 30/18154; B60W 30/09; B60W 30/08; B60W 40/02; G08G 1/167; G08G 1/166; G06K 9/00496; G06K 9/00825; G06K 9/00798; G06K 9/00805
See application file for complete search history.

VEHICLE CONTROL DEVICE, VEHICLE CONTROL METHOD, AND STORAGE MEDIUM

CROSS-REFERENCE TO RELATED APPLICATION

This application is based upon and claims the benefit of priority from Japanese Patent Application No. 2018-047996, filed Mar. 15, 2018, the entire content of which is incorporated herein by reference.

BACKGROUND

Field of the Invention

The present invention relates to a vehicle control device, a vehicle control method, and a storage medium.

Description of Related Art

In recent years, researches are being conducted on automatically controlling driving of a vehicle (hereinafter, referred to as automatic driving). On the other hand, a technology for estimating a target object that will cross or approach a subject vehicle from a course of the subject vehicle and map information at a place where target objects such as other vehicles cross the subject vehicle or approach the subject vehicle, estimating a region where the target object will cross the subject vehicle or approach the subject vehicle, superimposing the estimated target object or region on a map in advance, and displaying the estimated target object or region is known (refer to, for example, Japanese Unexamined Patent Application, First Publication No. 2005-165555).

SUMMARY

However, according to the related art, in a case where another vehicle progressing in a direction intersecting a progress direction of a subject vehicle is present, it is necessary to automatically drive the subject vehicle while always being aware of other vehicles entering the subject lane, and there may be cases where acceleration, deceleration, or the like is unnecessarily performed and thus the comfort of an occupant who is onboard the vehicle being impaired.

An aspect of the present invention has been made in consideration of such circumstances, and an object of the aspect of the present invention is to provide a vehicle control device, a vehicle control method, and a storage medium capable of performing automatic driving according to a trend of a surrounding vehicle while improving comfort of an occupant.

A vehicle control device, a vehicle control method, and a storage medium according to the present invention adopt the following constitutions.

According to an aspect (1) of the present invention, a vehicle control device includes a recognizer that is configured to recognize an object around a subject vehicle, a driving controller that is configured to control at least one of a speed and steering of the subject vehicle based on a position of the object recognized by the recognizer, and a predictor that is configured to predict that a predetermined vehicle will move to a front of the subject vehicle on a subject lane, in a case where the predetermined vehicle that is present at a position at which the predetermined vehicle is able to cross the subject lane on which the subject vehicle is present is recognized by the recognizer. In a case where the recognizer recognizes the predetermined vehicle, the driving controller is configured to perform predetermined vehicle behavior control in preparation for an entry of the predetermined vehicle to the subject lane in a case where it is predicted that the predetermined vehicle will move to the front of the subject vehicle on the subject lane by the predictor, and in a case where the recognizer recognizes the predetermined vehicle, the driving controller limits the predetermined vehicle behavior control in a case where it is predicted that the predetermined vehicle does not move to the front of the subject vehicle on the subject lane by the predictor as compared with a case where it is predicted that the predetermined vehicle will move to the front of the subject vehicle on the subject lane by the predictor.

According to an aspect of (2), in the vehicle control device according to the aspect of (1), in a case where it is predicted that the predetermined vehicle will move to the front of the subject vehicle on the subject lane by the predictor in a case where the recognizer recognizes the predetermined vehicle, the recognizer is configured to increase the degree of recognition of an object of a lane different from the subject lane, as compared with a case where it is predicted that the predetermined vehicle does not move to the front of the subject vehicle on the subject lane by the predictor in a case where the recognizer recognizes the predetermined vehicle.

According to an aspect of (3), in the vehicle control device according to an aspect of (1) or (2), the predetermined vehicle is a vehicle of which a progress direction is a direction intersecting a progress direction of the subject vehicle.

According to an aspect of (4), in the vehicle control device according to any one aspect of (1) to (3), in a case where it is predicted that the predetermined vehicle will move to the front of the subject vehicle on the subject lane by the predictor before the predetermined vehicle is present in the front of the subject vehicle and the subject vehicle will move to a front of the predetermined vehicle, the driving controller is configured to perform the predetermined vehicle behavior control.

According to an aspect of (5), in the vehicle control device according to any one aspect of (1) to (4), in a case where it is not recognized that another vehicle is present within a predetermined distance in front of the subject vehicle by the recognizer and the predetermined vehicle recognized by the recognizer does not enter the subject lane and stops, the predictor is configured to predict that the predetermined vehicle does not move to the front of the subject vehicle on the subject lane.

According to an aspect of (6), in the vehicle control device according to any one aspect of (1) to (5), the recognizer is further configured to recognize presence or absence of an operation of a turn signal lamp provided in the predetermined vehicle, and the predictor further is configured to predict that the predetermined vehicle will move to the front of the subject vehicle on the subject lane according to the recognized presence or absence of the operation of the turn signal lamp.

According to an aspect of (7), in the vehicle control device according to the aspect of (6), in a case where operation of a turn signal lamp on a side close to the subject vehicle among a plurality of turn signal lamps provided in the predetermined vehicle is recognized by the recognizer, the predictor is configured to predict that the predetermined vehicle will move to the front of the subject vehicle on the subject lane.

According to an aspect of (8), in the vehicle control device according to any one aspect of (1) to (7), the recognizer is further configured to recognize a plurality of lanes including the subject lane, and in a case where the plurality of lanes are recognized and another vehicle is not recognized within a predetermined distance in front of the subject vehicle on the subject lane by the recognizer, the predictor is configured to predict that the predetermined vehicle will move to the front of the subject vehicle on the subject lane in a case where the predetermined vehicle does not enter the subject lane.

According to an aspect of (9), in the vehicle control device according to any one aspect of (1) to (8), the recognizer is further configured to recognize a plurality of lanes including the subject lane and an adjacent lane that is adjacent to the subject lane, and in a case where the adjacent lane is recognized and it is recognized that one or more other vehicles are present on the adjacent lane by the recognizer, the predictor is configured to predict that the predetermined vehicle will move to the subject lane and further enters the adjacent lane in a case where the predetermined vehicle does not enter the subject lane.

According to an aspect of (10), in the vehicle control device according to the aspect of (9), the recognizer is further configured to recognize that a predetermined point at which progress direction of the vehicle is changed according to a road structure is present, and in a case where it is recognized that the predetermined point is present in front of the position at which the predetermined vehicle is able to cross the subject lane on which the subject vehicle is present by the recognizer as viewed from the subject vehicle, the predictor is configured to predict that the predetermined vehicle will move to the subject lane and further enters the adjacent lane.

According to an aspect of (11), in the vehicle control device according to any one aspect of (1) to (10), the recognizer is further configured to recognize that a pedestrian is present, and in a case where it is not recognized that the pedestrian is present in front of the position at which the pedestrian is able to cross the subject lane on which the subject vehicle is present by the recognizer as viewed from the subject vehicle, the predictor is configured to predict that the predetermined vehicle will move to the front of the subject vehicle on the subject lane.

According to an aspect (12) of the present invention, a vehicle control device includes a recognizer that is configured to recognize an object around a subject vehicle, a driving controller that is configured to control at least one of a speed and steering of the subject vehicle based on a position of the object recognized by the recognizer, and a predictor that is configured to predict that a predetermined vehicle will move to a front of the subject vehicle on a subject lane, in a case where the predetermined vehicle that is present at a position at which the predetermined vehicle is able to cross the subject lane on which the subject vehicle is present is recognized by the recognizer. In a case where it is predicted that the predetermined vehicle will move to the front of the subject vehicle on the subject lane by the predictor in a case where the recognizer recognizes the predetermined vehicle, the recognizer is configured to increase a degree of recognition of an object of a lane different from the subject lane, as compared with a case where it is predicted that the predetermined vehicle does not move to the front of the subject vehicle on the subject lane by the predictor in a case where the recognizer recognizes the predetermined vehicle.

According to an aspect of (13), a vehicle control method causes an in-vehicle computer to recognize an object around a subject vehicle, control at least one of a speed and steering of the subject vehicle based on a position of the recognized object, predict that a predetermined vehicle will move to a front of the subject vehicle on a subject lane, in a case where the predetermined vehicle that is present at a position at which the predetermined vehicle is able to cross the subject lane on which the subject vehicle is present is recognized, perform predetermined vehicle behavior control in preparation for an entry of the predetermined vehicle to the subject lane in a case where it is predicted that the predetermined vehicle will move to the front of the subject vehicle on the subject lane, in a case where the predetermined vehicle is recognized, and limit the predetermined vehicle behavior control in a case where it is predicted that the predetermined vehicle does not move to the front of the subject vehicle on the subject lane as compared with a case where it is predicted that the predetermined vehicle will move to the front of the subject vehicle on the subject lane in a case where the predetermined vehicle is recognized.

According to an aspect of (14), a computer-readable non-transitory storage medium storing a program that causes an in-vehicle computer to execute a process of recognizing an object around a subject vehicle, a process of controlling at least one of a speed and steering of the subject vehicle based on a position of the recognized object, a process of predicting that a predetermined vehicle will move to a front of the subject vehicle on a subject lane, in a case where the predetermined vehicle that is present at a position at which the predetermined vehicle is able to cross the subject lane on which the subject vehicle is present is recognized, a process of performing predetermined vehicle behavior control in preparation for an entry of the predetermined vehicle to the subject lane in a case where it is predicted that the predetermined vehicle will move to the front of the subject vehicle on the subject lane, in a case where the predetermined vehicle is recognized, and a process of limiting the predetermined vehicle behavior control in a case where it is predicted that the predetermined vehicle does not move to the front of the subject vehicle on the subject lane as compared with a case where it is predicted that the predetermined vehicle will move to the front of the subject vehicle on the subject lane in a case where the predetermined vehicle is recognized.

According to any aspect of (1) to (14), it is possible to perform automatic driving according to a trend of a surrounding vehicle while improving comfort of an occupant.

DESCRIPTION OF EMBODIMENTS

Hereinafter, embodiments of a vehicle control device, a vehicle control method, and a storage medium of the present invention will be described with reference to the drawings. A case where left-side driving is applied to the present invention will be described below, but in a case where right-side is applied to the present invention, it is only necessary to reverse left and right.

First Embodiment

[Overall Constitution]

Figure 1:
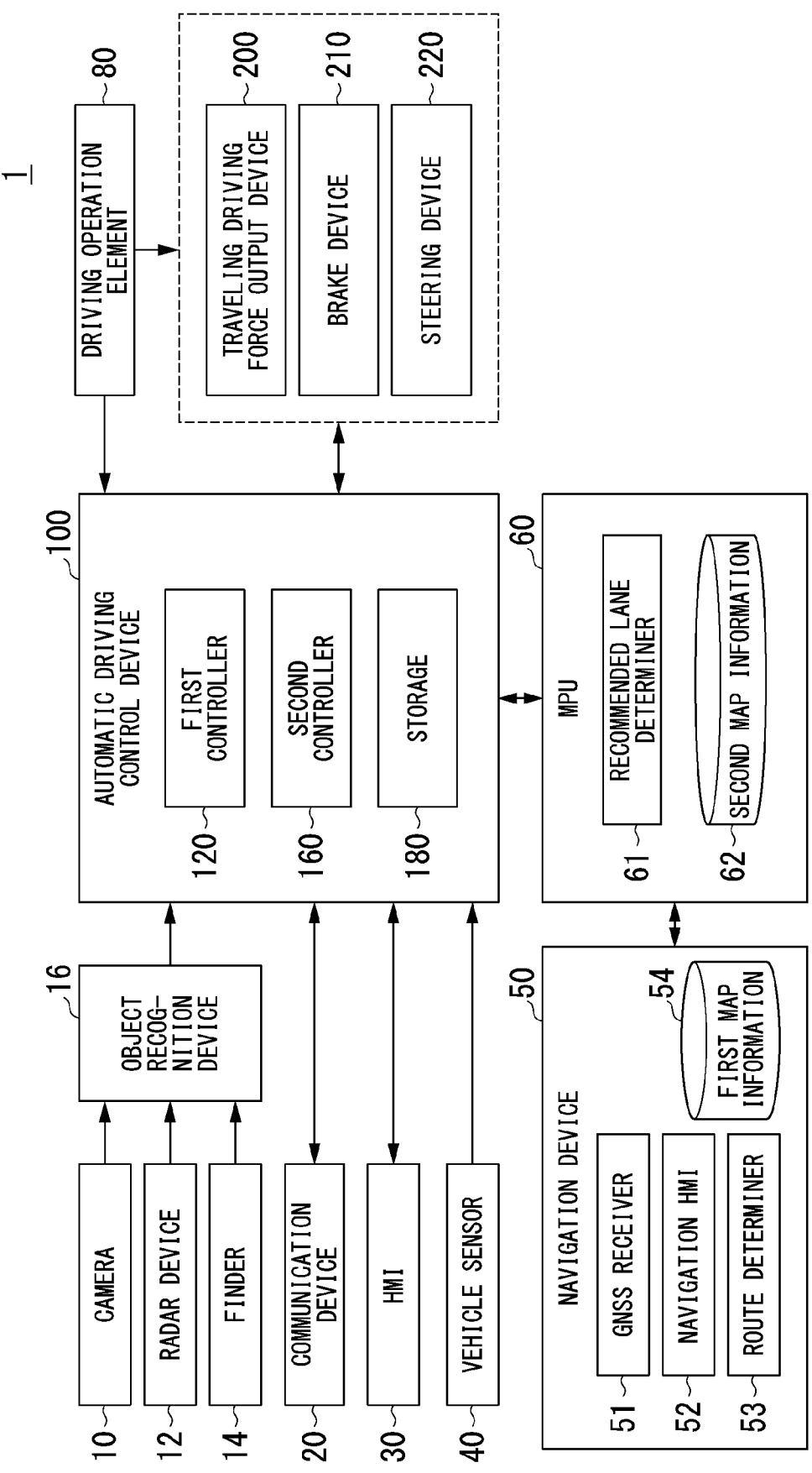
FIG. 1 is a constitution diagram of a vehicle system using a vehicle control device according to a first embodiment.

FIG. 1 is a constitution diagram of a vehicle system 1 using the vehicle control device according to a first embodiment. A vehicle (hereinafter, referred to as a subject vehicle M) in which the vehicle system 1 is mounted is, for example, a vehicle such as a two-wheeled vehicle, a three-wheeled vehicle, or a four-wheeled vehicle, and a driving source of the vehicle includes an internal combustion engine such as a diesel engine or a gasoline engine, an electric motor, or a combination thereof. The electric motor operates using electric power generated by a generator connected to the internal combustion engine, or discharge power of a secondary battery or a fuel cell.

For example, the vehicle system 1 includes a camera 10, a radar device 12, a finder 14, an object recognition device 16, a communication device 20, a human machine interface (HMI) 30, a vehicle sensor 40, a navigation device 50, a map positioning unit (MPU) 60, a driving operation element 80, an automatic driving control device 100, a traveling driving force output device 200, a brake device 210, and a steering device 220. Such devices and instruments are connected to each other by a multiplex communication line such as a controller area network (CAN) communication line, a serial communication line, a wireless communication network, or the like. The constitution shown in FIG. 1 is merely an example, and a part of the constitution may be omitted or other constitutions may be further added.

For example, the camera 10 is a digital camera using a solid imaging element such as a charge coupled device (CCD) or a complementary metal oxide semiconductor (CMOS). The camera 10 is attached to an arbitrary place on the subject vehicle M. In a case of forward imaging, the camera 10 is attached to an upper portion of a front windshield, a rear surface of a rearview mirror, or the like. For example, the camera 10 periodically repeats imaging of the surroundings of the subject vehicle M. The camera 10 may be a stereo camera.

The radar device 12 radiates radio waves such as millimeter waves or the like to the surroundings of the subject vehicle M and detects at least the position (distance and direction) of an object by detecting radio waves (reflected waves) reflected by the object. The radar device 12 is attached to an arbitrary place on the subject vehicle M. The radar device 12 may detect the position and the speed of the object by a frequency modulated continuous wave (FM-CW) method.

The finder 14 is a light detection and ranging (LIDAR). The finder 14 irradiates light around the subject vehicle M and measures scattered light. The finder 14 detects the distance to the object on the basis of a time from light emission to light reception. For example, the irradiated light is laser light of a pulse shape. The finder 14 is attached to an arbitrary place on the subject vehicle M.

The object recognition device 16 performs a sensor fusion process on a detection result of some or all of the camera 10, the radar device 12, and the finder 14 to recognize a position, a type, a speed, and the like of the object. The object recognition device 16 outputs a recognition result to the automatic driving control device 100. The object recognition device 16 may output the detection result of the camera 10, the radar device 12, and the finder 14 as they are to the automatic driving control device 100. The object recognition device 16 may be omitted from the vehicle system 1.

For example, the communication device 20 communicates with another vehicle near the subject vehicle M using a cellular network, a Wi-Fi network, Bluetooth (registered trademark), dedicated short range communication (DSRC), or the like, or communicates with various server devices through a wireless base station.

The HMI 30 presents various types of information to an occupant of the subject vehicle M and receives an input operation by the occupant. The HMI 30 includes various display devices, speakers, buzzers, touch panels, switches, keys, and the like.

The vehicle sensor 40 includes a vehicle speed sensor that detects a speed of the subject vehicle M, an acceleration sensor that detects acceleration, a yaw rate sensor that detects an angular velocity around a vertical axis, a direction sensor that detects a direction of the subject vehicle M, and the like.

For example, the navigation device 50 includes a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies the position of the subject vehicle M on the basis of a signal received from a GNSS satellite. The position of the subject vehicle M may be specified or supplemented by an inertial navigation system (INS) using an output of the vehicle sensor 40.

The navigation HMI 52 includes a display device, a speaker, a touch panel, a key, and the like. A part or all of the navigation HMI 52 may be shared with the above-described HMI 30.

For example, the route determiner 53 determines a route (hereinafter referred to as a route on a map) from the position of the subject vehicle M specified by the GNSS receiver 51 (or an input arbitrary position) to a destination input by the occupant using the navigation HMI 52 by referring to the first map information 54. For example, the first map information 54 is information in which a road shape is expressed by a link indicating a road and nodes connected by the link. The first map information 54 may include a curvature of the road, point of interest (POI) information, or the like. The route on the map is output to the MPU 60.

The navigation device 50 may perform route guidance using the navigation HMI 52 on the basis of the route on the map. For example, the navigation device 50 may be realized by a function of a terminal device such as a smartphone or a tablet terminal possessed by the occupant. The navigation device 50 may transmit a current position and a destination to a navigation server through the communication device 20 and acquire the same route as the route on the map from the navigation server.

For example, the MPU 60 includes a recommended lane determiner 61 and holds second map information 62 in the storage device such as an HDD or a flash memory. The recommended lane determiner 61 divides the route on the map provided from the navigation device 50 into a plurality of blocks (for example, divides the route into intervals of 100 [m] in a vehicle traveling direction), and determines a recommended lane for each block by referring to the second map information 62. The recommended lane determiner 61 determines the number of a lane from the left that the vehicle travels in. In a case where there is a branching position on the route on the map, the recommended lane determiner 61 determines the recommended lane so that the subject vehicle M is able to travel on a reasonable travel route for progressing to a branch destination.

The second map information 62 is map information with higher accuracy than the first map information 54. For example, the second map information 62 may include information on the center of the lane, information on the boundary of the lane, information on the type of the lane, and the like. The second map information 62 may include road information, traffic regulation information, address information (an address and a postal code), facility information, telephone number information, and the like. The second map information 62 may be updated at any time by the communication device 20 communicating with another device.

The driving operation element 80 includes, for example, an acceleration pedal, a brake pedal, a shift lever, a steering wheel, a modified steering wheel, a joystick, and other operation elements. A sensor that detects the operation amount or presence or absence of an operation is attached to the driving operation element 80, and a detection result of the sensor is output to a part or all of the automatic driving control device 100, or the traveling driving force output device 200, the brake device 210, and the steering device 220.

For example, the automatic driving control device 100 includes a first controller 120, a second controller 160, and a storage 180. For example, the first controller 120 and the second controller 160 are realized by a processor such as a central processing unit (CPU) or a graphics processing unit (GPU) executing a program (software). Some or all of such constitution elements may be realized by hardware (a circuit unit including a circuitry) such as a large scale integration (LSI), an application specific integrated circuit (ASIC), or a field-programmable gate array (FPGA), or may be realized by software and hardware in cooperation. The program may be stored in the storage 180 of the automatic driving control device 100 in advance. Alternatively, the program may be stored in a detachable storage medium such as a DVD or a CD-ROM and may be installed in the storage 180 by attachment of the storage medium to a drive device.

The storage 180 is realized by, for example, a HDD, a flash memory, an electrically erasable programmable read only memory (EEPROM), a read only memory (ROM), a random access memory (RAM), or the like. The storage 180 stores, for example, a program read and executed by the processor.

Figure 2:
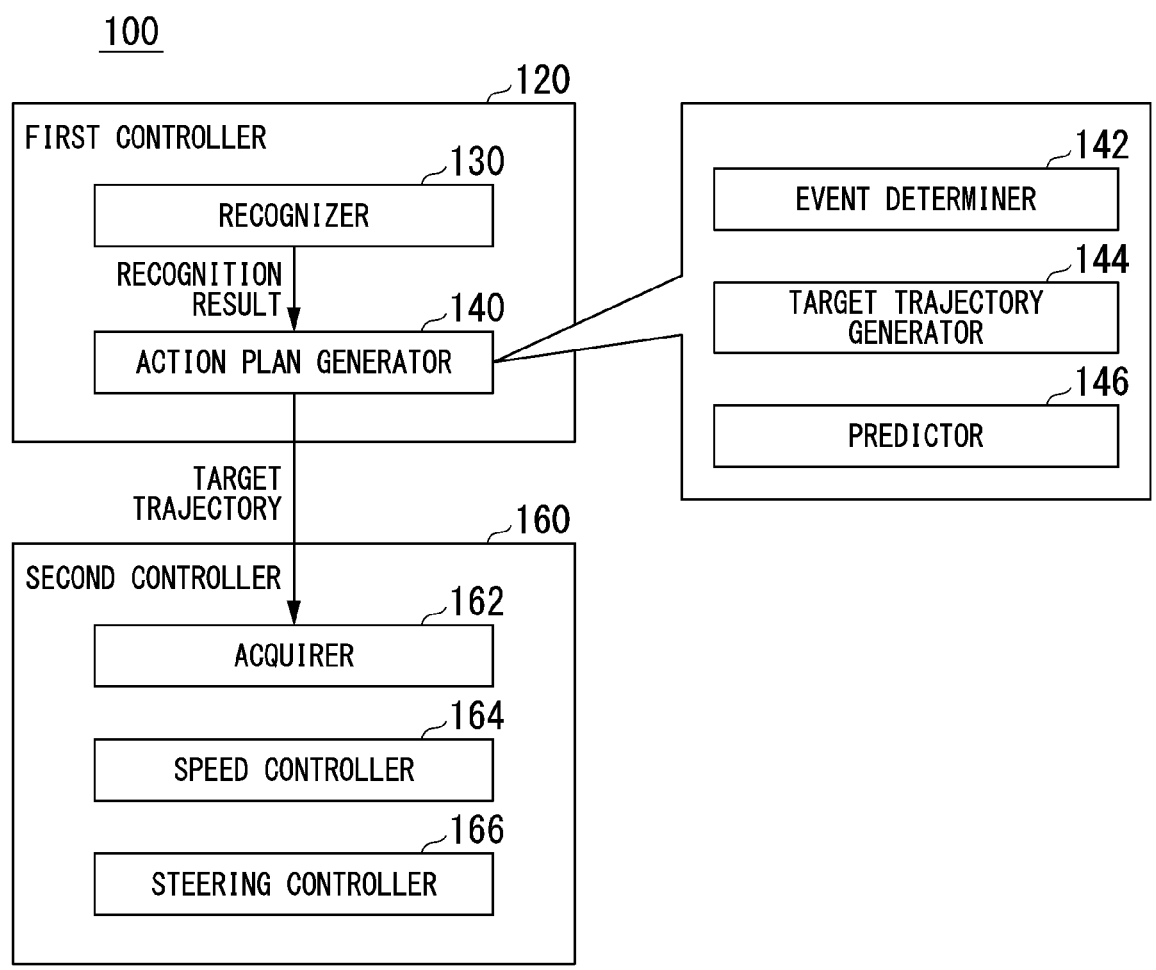
FIG. 2 is a functional constitution diagram of a first controller and a second controller.

FIG. 2 is a functional constitution diagram of the first controller 120 and the second controller 160. For example, the first controller 120 includes a recognizer 130 and an action plan generator 140. For example, the first controller 120 realizes a function of artificial intelligence (AI) and a function of a previously given model in parallel. For example, a function of "recognizing an intersection" is executed in parallel with recognition of an intersection by deep learning or the like and recognition according to a previously given condition (there is a pattern matching signal, a road sign, or the like) and may be realized by giving scores to both sides and comprehensively evaluating the scores. Therefore, reliability of automatic driving is guaranteed.

The recognizer 130 recognizes an object that is present in the vicinity of the subject vehicle M on the basis of the information input from the camera 10, the radar device 12, and the finder 14 through the object recognition device 16. The object recognized by the recognizer 130 includes, for example, a four-wheeled vehicle, a two-wheeled vehicle, a pedestrian, a road sign, a road mark, a lane marking, a utility pole, a guardrail, a falling object, and the like. The recognizer 130 recognizes a state of the object, such as a position, a speed, an acceleration, or the like. For example, the position of the object is recognized as a position on an absolute coordinate (that is, a relative position with respect to the subject vehicle M) using a representative point (center of gravity, driving axis center, or the like) of the subject vehicle M as an origin and is used for control. The position of the object may be represented by a representative point such as a center of gravity or a corner of the object, or may be represented by an expressed region. The "state" of the object may include an acceleration or jerk of the object, or "behavioral state" (for example, the object changes a lane or whether or not the object is about to change the lane).

For example, the recognizer 130 recognizes a subject lane in which the subject vehicle M is traveling and an adjacent lane adjacent to the subject lane. For example, the recognizer 130 recognizes the subject lane or the adjacent lane by comparing a pattern of a road lane marking (for example, an arrangement of a solid line and a broken line) obtained from the second map information 62 with a pattern of a road lane marking near the subject vehicle M recognized from the image captured by the camera 10.

The recognizer 130 may recognize the subject lane or the adjacent lane by recognizing a traveling road boundary (a road boundary) including a road lane marking, a road shoulder, a curb, a median strip, a guardrail, and the like, and is not limited to recognizing road lane markings. In this recognition, the position of the subject vehicle M acquired from the navigation device 50 or a process result by an INS may be added. The recognizer 130 recognizes a temporary stop line, an obstacle, a red light, a toll gate, and other road events.

When recognizing the subject lane, the recognizer 130 recognizes the relative position and a posture of the subject vehicle M with respect to the subject lane. For example, the recognizer 130 may recognize an angle formed by a deviation of a reference point of the subject vehicle M from a center of the lane and a line connecting the center of the lane of a traveling direction of the subject vehicle M as a relative position and the posture of the subject vehicle M with respect to the subject lane. Instead of this, the recognizer 130 may recognize a position of the reference point of the subject vehicle M with respect to one of side end portions (the road lane marking or the road boundary) of the subject lane as the relative position of the subject vehicle M with respect to the subject lane.

The action plan generator 140 includes, for example, an event determiner 142, a target trajectory generator 144, and a predictor 146. The event determiner 142 determines an automatic driving event on the route on which the recommended lane is determined. The event is information that prescribes a traveling mode of the subject vehicle M.

The event includes, for example, a constant-speed traveling event in which the subject vehicle M is caused to travel on the same lane at a constant speed, a follow-up traveling event in which the subject vehicle M is caused to follow the other nearby vehicle (hereinafter, referred to as a preceding vehicle) that is present within a predetermined distance (for example, within 100 [m]) in front of the subject vehicle M, a lane change event in which the subject vehicle M is caused to change the lane from the subject lane to the adjacent lane, a branch event in which the subject vehicle M is caused to branch to a target lane at a branch point of a road, a confluence event in which the subject vehicle M is caused to join to a main line at a confluence point, a takeover event for ending the automatic driving and switching to the manual driving, and the like. For example, the "following" may be a traveling mode in which an inter-vehicle distance (relative distance) between the subject vehicle M and the preceding vehicle is kept constant, or may be a traveling mode in which the inter-vehicle distance between the subject vehicle M and the preceding vehicle is constant and the subject vehicle M is caused to travel at a center of the subject lane. For example, the event may include an overtaking event in which the subject vehicle M is caused to change the lane to the adjacent lane, overtake the preceding vehicle in the adjacent lane, and change the lane to an original lane again, or in which the subject vehicle M is caused to move closer to a lane marking partitioning the subject lane without changing the lane to the adjacent lane, overtake the preceding vehicle within the same lane, and return the subject vehicle M to an original position (for example, a lane center), and an avoidance event in which the subject vehicle is caused to perform at least one of braking and steering so as to avoid an obstacle that is present in front of the subject vehicle M, and the like.

For example, the event determiner 142 may change an event that has already been determined for a current section to another event in accordance with a surrounding situation recognized by the recognizer 130 when the subject vehicle M is traveling, or may determine a new event for the current section.

In principle, the target trajectory generator 144 generates a future target trajectory that causes the subject vehicle M to travel automatically (without depending on the operation of the driver) in the traveling mode prescribed by the event, in order to cope with the surrounding situation when the subject vehicle M travels on the recommended lane determined by the recommended lane determiner 61 and the subject vehicle M further travels the recommended lane. The target trajectory includes, for example, a position element that defines a future position of the subject vehicle M, and a speed element that defines a future speed of the subject vehicle M, and the like.

For example, the target trajectory generator 144 determines a plurality of points (trajectory points) to which the subject vehicle M should sequentially reach as the position element of the target trajectory. The trajectory point is a point to which the subject vehicle M should reach for each predetermined traveling distance (for example, about several [m]). The predetermined traveling distance may be calculated, for example, by a road distance when traveling along the route.

The target trajectory generator 144 determines a target speed and a target acceleration for each predetermined sampling time (for example, about 0 comma [sec]) as the speed element of the target trajectory. The trajectory point may be a position to which the subject vehicle M should reach at a sampling time for each predetermined sampling time. In this case, the target speed and the target acceleration are determined by the sampling time and an interval between the trajectory points. The target trajectory generator 144 outputs information indicating the generated target trajectory to the second controller 160.

In a case where a crossing vehicle $m_{Ta}$ is recognized by the recognizer 130 within a first predetermined distance $D_{THX1}$ in front of the subject vehicle M in the progress direction, the predictor 146 predicts that the crossing vehicle $m_{Ta}$ crosses the subject lane on which the subject vehicle M is present on the basis of the recognition result of the recognizer 130. The crossing vehicle $m_{Ta}$ is another vehicle of which a progress direction is a direction intersecting the progress direction of the vehicle M. For example, the crossing vehicle $m_{Ta}$ is a vehicle parked in a parking lot facing a road including the subject lane, or a vehicle entering from another lane intersecting the road including the subject lane. The first predetermined distance $D_{THX1}$ may be, for example, a distance of about 50 [m] to 100 [m]. The direction intersecting the progress direction of the subject vehicle M is, for example, a direction in which an angle formed by the progress direction of the subject vehicle M falls within an angular range of about plus or minus 70 [°] on the basis of 90 [°]. For example, "the crossing vehicle $m_{Ta}$ crosses the subject lane" means that the crossing vehicle $m_{Ta}$ moves to the front of the subject vehicle M on the subject lane and further moves to the adjacent lane that is adjacent to the subject lane. The crossing vehicle $m_{Ta}$ is an example of a "predetermined vehicle".

Figure 3:
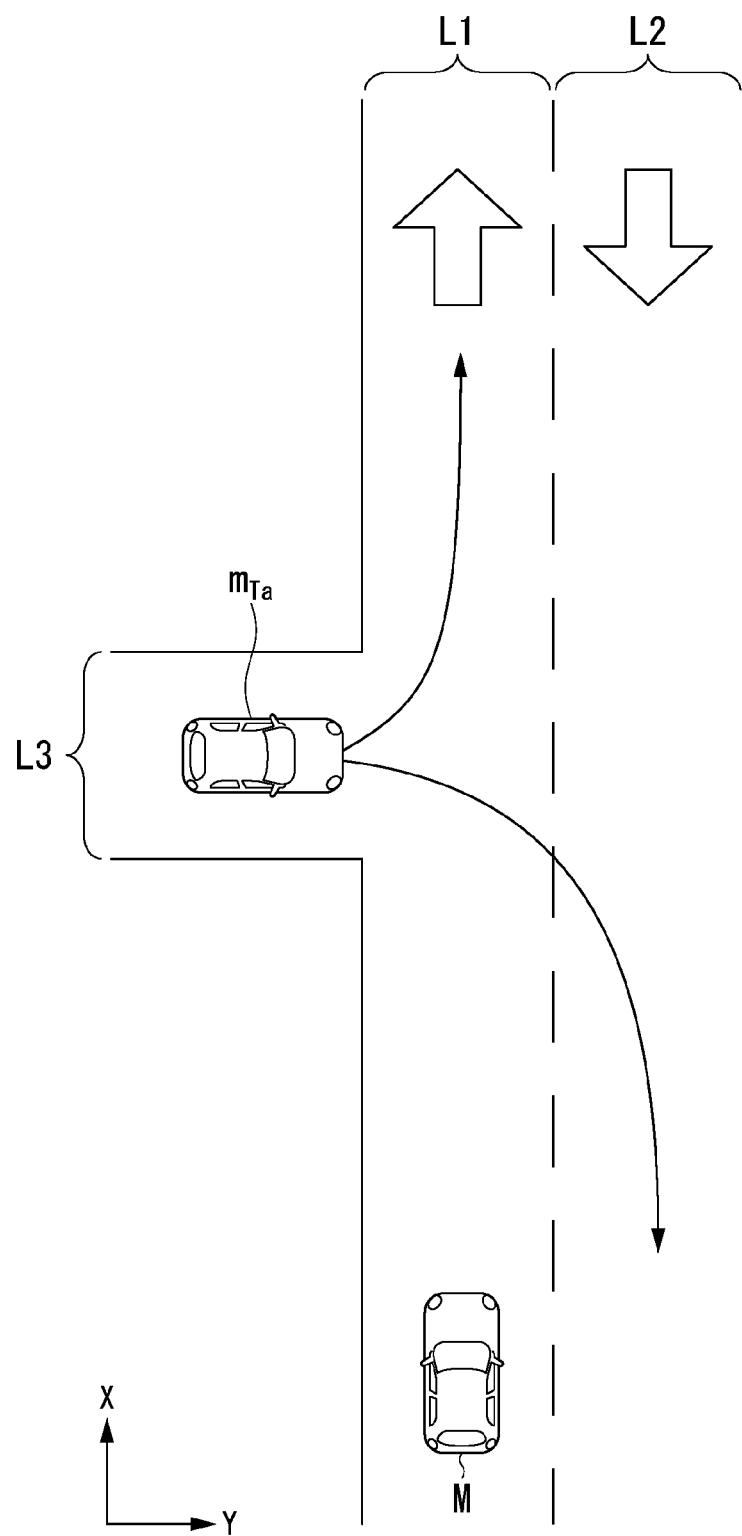
FIG. 3 is a diagram schematically showing a certain intersection.

FIG. 3 is a diagram schematically showing a certain intersection. In the figure, L1 represents the subject lane, L2 represents the adjacent lane that is adjacent to the subject lane and represents an oncoming lane on which another vehicle progressing in a direction opposite to the progress direction of the subject vehicle M travels, L3 represents a lane intersecting the subject lane L1 (hereinafter referred to as an intersecting lane). X represents the progress direction of the subject vehicle M, and Y represents the vehicle width direction. At the intersection in the figure, it is assumed that traffic control is not performed by a traffic light and the like.

As shown example, in a case of viewing from the subject vehicle M traveling on the subject lane L1, another vehicle traveling on the intersecting lane L3 is recognized as the crossing vehicle $m_{Ta}$. The subject lane L1 and the oncoming lane L2 are partitioned by a center line, and traveling of a vehicle that is present on the subject lane L1 or the oncoming lane L2 is prioritized over a vehicle that is present on the intersecting lane L3. That is, the subject lane L1 and the oncoming lane L2 are priority roads. In this case, in a case where the crossing vehicle $m_{Ta}$ reaches the intersection where the subject lane L1 and the intersecting lane L3 intersect, the crossing vehicle $m_{Ta}$ slowly travels or stops and then enters the priority road. The intersecting lane L3 intersecting the subject lane L1 or the intersection where the subject lane L1 and the intersecting lane L3 intersect is an example of a "position at which the crossing vehicle $m_{Ta}$ is able to cross the subject lane".

For example, in a case where it is recognized that the crossing vehicle $m_{Ta}$ is stopped in front of the subject lane L1 of the intersecting lane L3 by the recognizer 130, the predictor 146 predicts that the crossing vehicle $m_{Ta}$ turns left at the intersection and changes a lane to the subject lane L1 or predicts that the crossing vehicle $m_{Ta}$ turns right at the intersection, crosses the subject lane L1, and changes the lane to the oncoming lane L2.

The event determiner 142 changes the event determined for the current section in which the subject vehicle M travels to another event on the basis of a prediction result by the predictor 146. For example, in a case where it is predicted that the crossing vehicle $m_{Ta}$ turns left at the intersection and changes the lane to the subject lane L1 by the predictor 146, since the crossing vehicle $m_{Ta}$ appears in front of the subject vehicle M on the subject lane L1 at a certain time in the future, the event determiner 142 changes the current event to the follow-up traveling event in which the subject vehicle M follows the crossing vehicle $m_{Ta}$ as the preceding vehicle. In response to this, for example, the target trajectory generator 144 generates a target trajectory including a target speed for decelerating the subject vehicle M as the speed element in order to keep the inter-vehicle distance between the subject vehicle M and the crossing vehicle $m_{Ta}$ constant.

In a case where it is predicted that the crossing vehicle $m_{Ta}$ crosses the subject lane and enters the adjacent lane by the predictor 146, the event determiner 142 may maintain the current event without changing the current event.

The second controller 160 controls the traveling driving force output device 200, the brake device 210, and the steering device 220 so that the subject vehicle M passes through the target trajectory generated by the target trajectory generator 144 at a scheduled time.

For example, the second controller 160 includes an acquirer 162, a speed controller 164, and a steering controller 166. A combination of the event determiner 142, the target trajectory generator 144, and the second controller 160 is an example of a "driving controller".

The acquirer 162 acquires information on the target trajectory (a trajectory point) generated by the target trajectory generator 144 and stores the information on the target trajectory in a memory of the storage 180.

The speed controller 164 controls one or both of the traveling driving force output device 200 and the brake device 210 on the basis of the speed element (for example, target speed, target acceleration, or the like) included in the target trajectory that is stored in the memory.

The steering controller 166 controls the steering device 220 according to the position element (for example, curvature representing a degree of curvature of the target trajectory) included in the target trajectory that is stored in the memory. Hereinafter, control of one or both of the traveling driving force output device 200, the brake device 210, and the steering device 220 will be referred to as "automatic driving".

For example, a process of the speed controller 164 and the steering controller 166 is realized by a combination of feed-forward control and feedback control. As an example, the steering controller 166 is executed by a combination of feed-forward control according to a curvature of the road ahead of the subject vehicle M and feedback control according to the deviation from the target trajectory.

The traveling driving force output device 200 outputs, to driving wheels, traveling driving force (torque) for enabling the vehicle to travel. For example, the traveling driving force output device 200 includes a combination of an internal combustion engine, an electric motor, a transmission, and the like, and a power electronic controller (ECU) that controls the internal combustion engine, the electric motor, the transmission, and the like. The power ECU controls the above-described constitutions according to the information input from the second controller 160 or the information input from the driving operation element 80.

For example, the brake device 210 includes a brake caliper, a cylinder that transfers oil pressure to the brake caliper, an electric motor that generates the oil pressure in the cylinder, and a brake ECU. The brake ECU controls the electric motor according to the information input from the second controller 160 or the information input from the driving operation element 80, so that a brake torque according to a control operation is output to each wheel. The brake device 210 may include a mechanism for transferring the oil pressure generated by an operation of a brake pedal included in the driving operation element 80 to the cylinder through a master cylinder as a backup. The brake device 210 is not limited to the constitution described above, and may be an electronic control method oil pressure brake device that controls an actuator according to the information input from the second controller 160 to transfer the oil pressure of the master cylinder to the cylinder.

For example, the steering device 220 includes a steering ECU and an electric motor. For example, the electric motor changes a direction of steerable wheels by applying a force to a rack and pinion mechanism. The steering ECU changes the direction of the steerable wheels by driving the electric motor according to the information input from the second controller 160 or the information input from the driving operation element 80.

[Process Flow]

Figure 4:
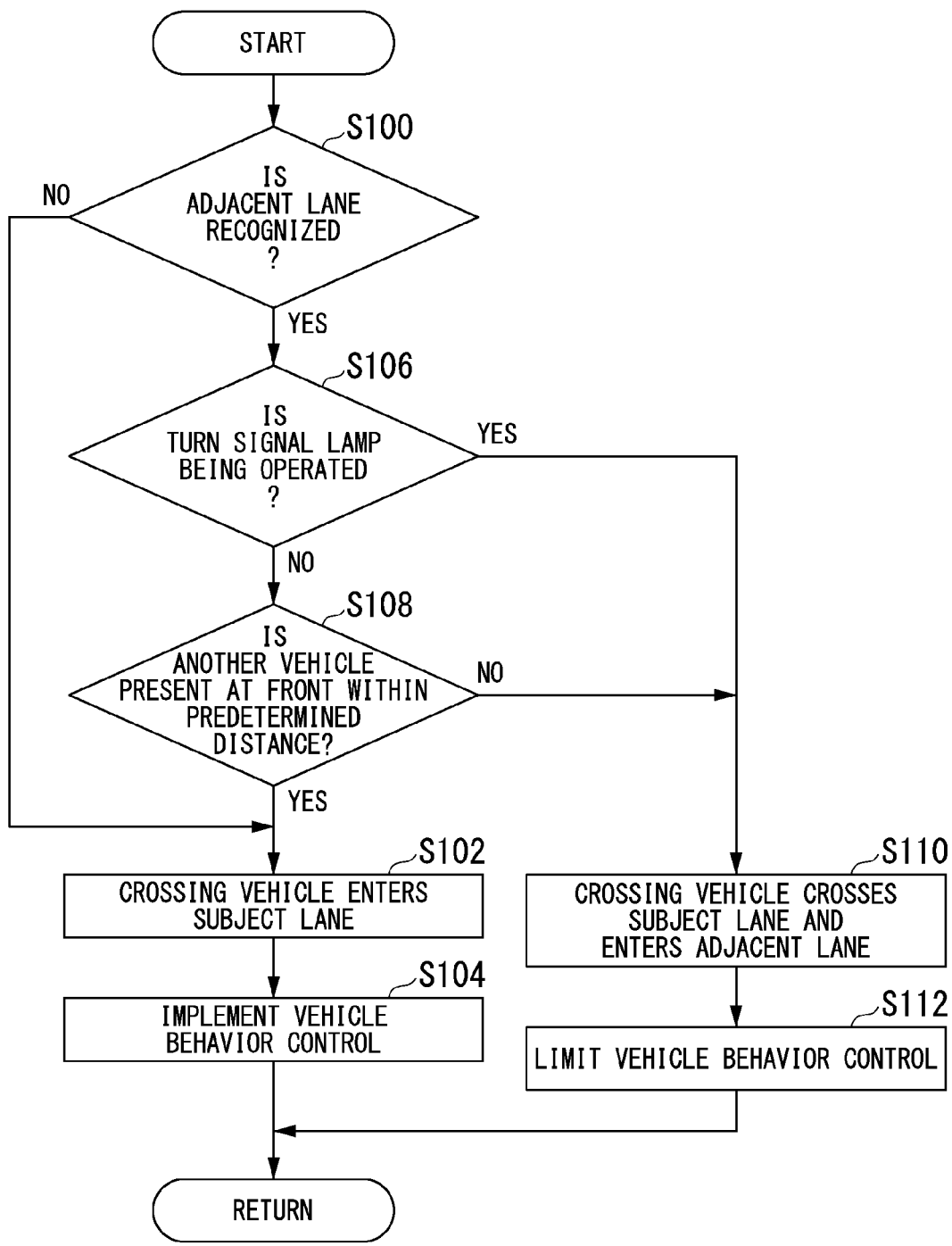
FIG. 4 is a flowchart showing an example of a flow of a series of processes by an automatic driving control device according to the first embodiment.

Hereinafter, a flow of a series of processes by the automatic driving control device 100 of the first embodiment will be described with reference to a flowchart. FIG. 4 is a flowchart showing an example of a flow of a series of processes by the automatic driving control device 100 according to the first embodiment. The process of the present flowchart may be repeatedly executed at a predetermined period, for example, in a case where the crossing vehicle $m_{Ta}$ is recognized within a first predetermined distance $D_{THX1}$ in front of the subject vehicle M in the progress direction by the recognizer 130.

First, the predictor 146 determines whether or not the adjacent lane that is adjacent to the subject lane is recognized by the recognizer 130 (step S100), and in a case where it is determined that the adjacent lane is not recognized by the recognizer 130, the predictor 146 predicts that the crossing vehicle $m_{Ta}$ will enter the subject lane (step S102).

Next, in a case where a prediction result by the predictor 146 is a prediction result that the crossing vehicle $m_{Ta}$ will enter the subject lane, the automatic driving control device 100 performs predetermined vehicle behavior control in preparation for the entry of the crossing vehicle $m_{Ta}$ to the subject lane (step S104). For example, the predetermined vehicle behavior control includes one or both of speed control for making the inter-vehicle distance between the subject vehicle M and the crossing vehicle $m_{Ta}$ constant and steering control for causing the subject vehicle M to move away from the crossing vehicle $m_{Ta}$ in the vehicle width direction. More specifically, the predetermined vehicle behavior control includes limiting an acceleration of the subject vehicle M, decelerating the subject vehicle M, causing the subject vehicle M to move closer to a lane marking partitioning the subject lane, or causing the subject vehicle M to cross the lane marking and to change the lane to the adjacent lane.

For example, as the predetermined vehicle behavior control, the event determiner 142 may change the current event to the follow-up traveling event in which the crossing vehicle $m_{Ta}$ is set as a follow-up target, or the avoidance event in which the crossing vehicle $m_{Ta}$ is set as an obstacle to be avoided. In a case where the current event is changed to the follow-up traveling event, the target trajectory generator 144 determines a target speed or a target acceleration that makes the inter-vehicle distance (a relative distance in the progress direction of the subject vehicle M) between the subject vehicle M and the crossing vehicle $m_{Ta}$ constant, and generates a target trajectory including the target speed and the target acceleration as the speed element. In a case where the current event is changed to the avoidance event, the target trajectory generator 144 determines dispositions of a plurality of trajectory points so that the relative distance between the subject vehicle M and the crossing vehicle $m_{Ta}$ in the vehicle width progress direction is equal to or greater than a certain distance, and generates a target trajectory including the plurality of trajectory points as the position element. The second controller controls at least one of the speed and the steering of the subject vehicle M according to the target trajectory corresponding to the follow-up traveling event or the target trajectory corresponding to the avoidance event, and causes the subject vehicle M to be relatively away from the crossing vehicle $m_{Ta}$ when the crossing vehicle $m_{Ta}$ enters the subject lane.

On the other hand, in the process of S100, in a case where it is determined that the adjacent lane is recognized by the recognizer 130, the predictor 146 further determines whether or not it is recognized that a turn signal lamp (turn lamp) close to a side of the subject vehicle M is being operated (is being turned on or blinking) among a plurality of turn signal lamps provided in the crossing vehicle $m_{Ta}$ by the recognizer 130 (step S106). For example, as shown in FIG. 4, in a case where the crossing vehicle $m_{Ta}$ enters the subject lane L1 from the left side as viewed from the vehicle M, a right turn signal lamp (a turn signal lamp for instructing a right turn) of the crossing vehicle $m_{Ta}$ is the turn signal lamp close to the side of the subject vehicle M.

In a case where it is not recognized that the turn signal lamp of the crossing vehicle $m_{Ta}$ on the side of the subject vehicle M is being operated by the recognizer 130, the predictor 146 further determines whether or not it is recognized that one or more other vehicles are present within a second predetermined distance $D_{THX2}$ in front of the subject vehicle M (step S108). The second predetermined distance $D_{THX2}$ may be, for example, the same distance as the first predetermined distance $D_{THX1}$ or may be a distance different from the first predetermined distance $D_{THX1}$.

In a case where it is recognized that the one or more other vehicles are present within the second predetermined distance $D_{THX2}$ in front of the subject vehicle M by the recognizer 130, the predictor 146 proceeds to the process of S102 and predicts that the crossing vehicle $m_{Ta}$ will enter the subject lane.

On the other hand, in a case where it is recognized that the turn signal lamp of the crossing vehicle $m_{Ta}$ on the side of the subject vehicle M is being operated by the recognizer 130, or in a case where it is not recognized that the turn signal lamp of the crossing vehicle $m_{Ta}$ on the side of the subject vehicle M is being operated and it is not recognized that the one or more other vehicles are present within the second predetermined distance $D_{THX2}$ in front of the subject vehicle M by the recognizer 130, the predictor 146 predicts that the crossing vehicle $m_{Ta}$ will cross the subject lane and enter the adjacent lane (step S110).

Next, in a case where the prediction result by the predictor 146 is a prediction result that the crossing vehicle $m_{Ta}$ will cross the subject lane and enter the adjacent lane, the automatic driving control device 100 limits (suppresses) the predetermined vehicle behavior control as compared with a case where the prediction result is the prediction result that the crossing vehicle $m_{Ta}$ will enter the subject lane (step S112). The limitation (suppression) of the predetermined vehicle behavior control is, for example, stopping one or both of the speed control for keeping the inter-vehicle distance between the subject vehicle M and the crossing vehicle $m_{Ta}$ constant and the steering control for causing the subject vehicle M to move away from the crossing vehicle $m_{Ta}$ in the vehicle width direction, or reducing the acceleration when the inter-vehicle distance is constant, or reducing a steering angle at which the subject vehicle M is caused to move away from the crossing vehicle $m_{Ta}$.

Figure 5:
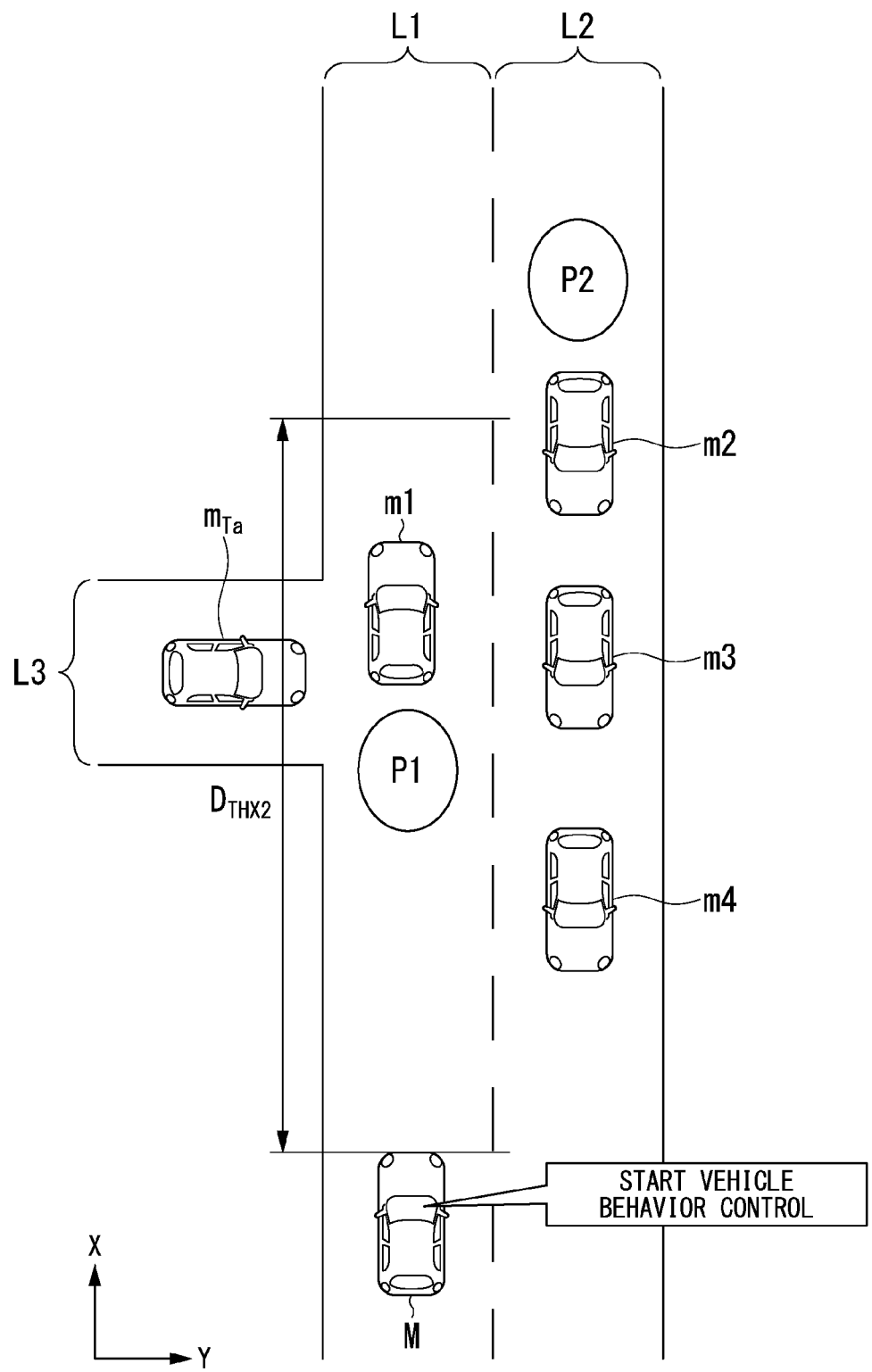
FIG. 5 is a diagram showing an example of a scene in which it is predicted that a crossing vehicle will enter a subject lane.
Figure 6:
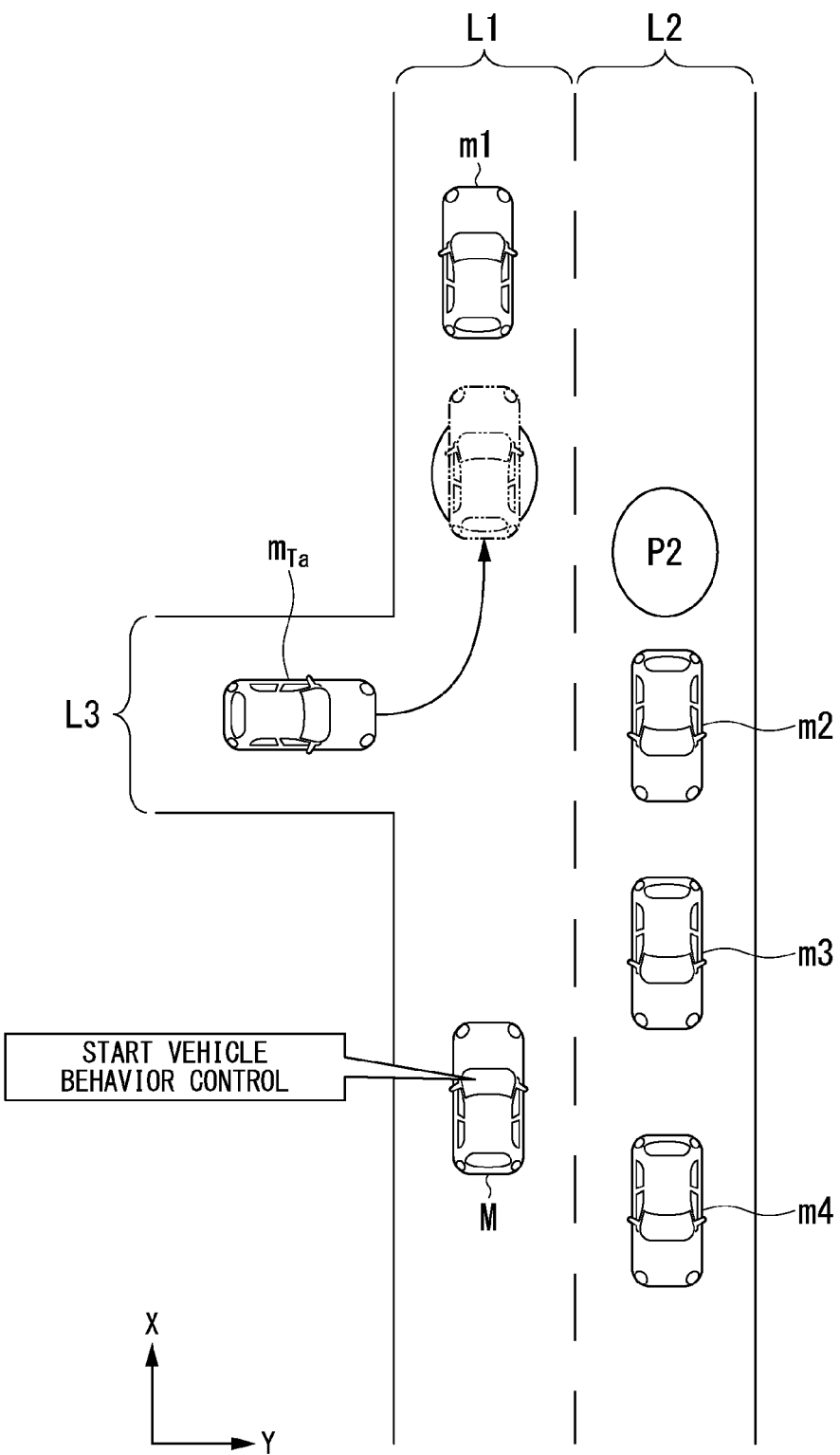
FIG. 6 is a diagram showing an example of the scene in which it is predicted that the crossing vehicle will enter the subject lane.

FIGS. 5 and 6 are diagrams showing an example of a scene in which it is predicted that the crossing vehicle will enter the subject lane. In the shown example, the adjacent lane L2 adjacent to the subject lane L1 is an oncoming lane. In the subject lane L1, the other vehicle m1 (preceding vehicle) is present within the second predetermined distance $D_{THX2}$ in front of the subject vehicle M, and in the adjacent lane L2, a plurality of other vehicles m2 to m4 are present. In such a case, there is a high probability that the crossing vehicle $m_{Ta}$ will move to a position (P1 in the figure) behind the other vehicle m1 on the subject lane L1 or a position (P2 in the figure) behind the other vehicle m2 on the adjacent lane L2. Therefore, the predictor 146 predicts whether the crossing vehicle $m_{Ta}$ will enter the subject lane L1 in order to move to the position P1 or the crossing vehicle $m_{Ta}$ will cross the subject lane L1 and enter the adjacent lane L2 in order to move to the position P2, on the basis of presence or absence of the operation of the turn signal lamp on the right side of the crossing vehicle $m_{Ta}$ in the progress direction and the position of the other vehicle that is present on the subject lane L1.

In the scene shown in FIG. 5, since a probability that the other vehicle m1 is present within the second predetermined distance $D_{THX2}$ in front of the subject vehicle M and the crossing vehicle $m_{Ta}$ waits until the other vehicle m1 of the subject lane L1 that is the lane priority to the intersecting lane L3 passes is high, as in the scene shown in FIG. 6, the predictor 146 predicts that the crossing vehicle $m_{Ta}$ will enter the subject lane L1 before the other vehicle m1 passes through the front of the crossing vehicle $m_{Ta}$ and the subject vehicle M reaches the intersection with the intersecting lane.

For example, in a case where it is predicted that the crossing vehicle $m_{Ta}$ will enter the subject lane L1 by the predictor 146, the event determiner 142 changes the current event to the follow-up traveling event in which the crossing vehicle $m_{Ta}$ is set as the follow-up target, or the avoidance event in which the crossing vehicle $m_{Ta}$ is set as the obstacle to be avoided. Therefore, as the predetermined vehicle behavior control, the subject vehicle M is able to decelerate in advance in anticipation that the crossing vehicle $m_{Ta}$ will enter the subject lane L1 or is able to leave a certain distance or more from the crossing vehicle $m_{Ta}$ by moving to a side of the adjacent lane L2 in the subject lane L1.

Figure 7:
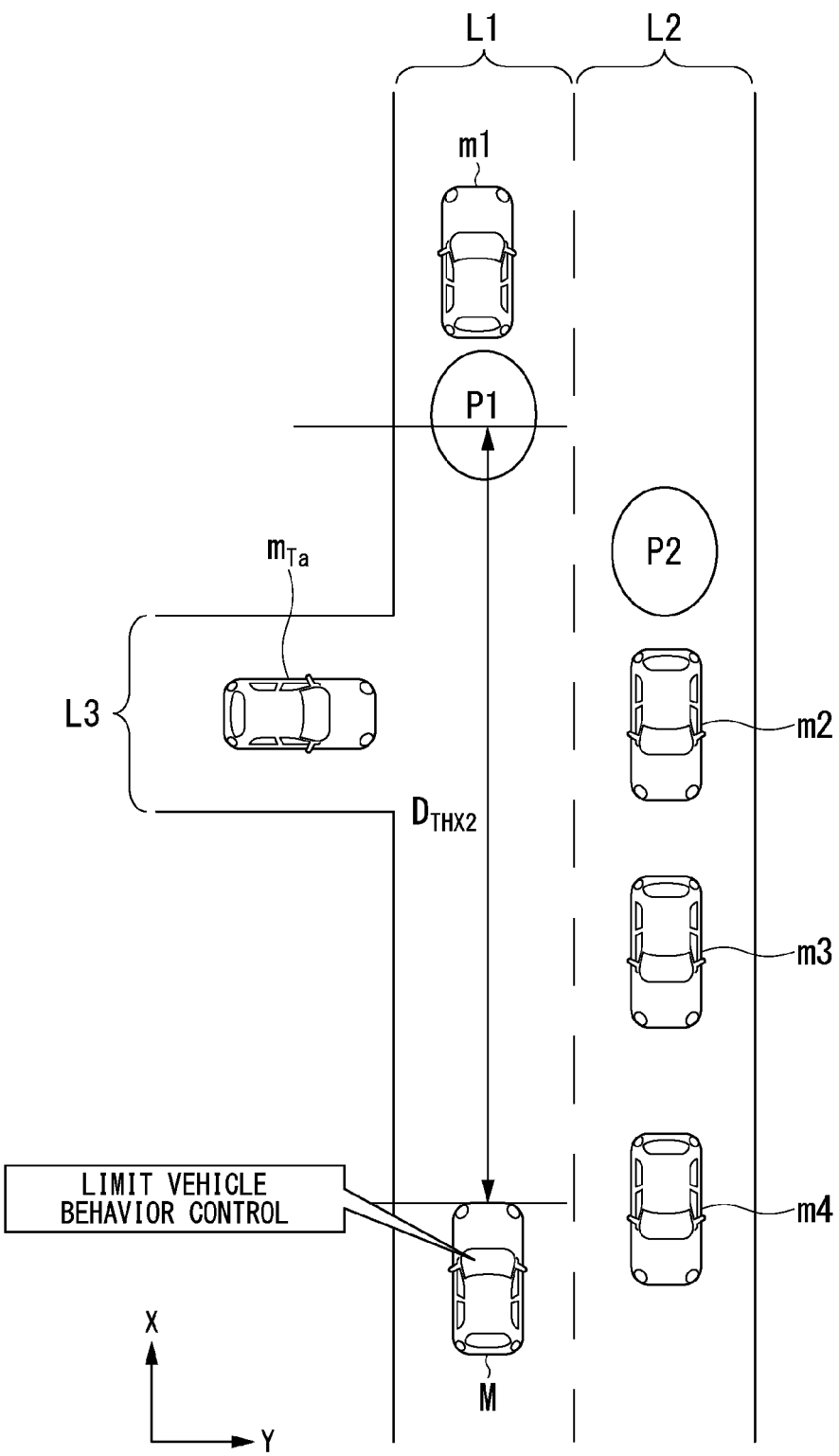
FIG. 7 is a diagram showing an example of a scene in which it is predicted that the crossing vehicle will cross the subject lane and enter an adjacent lane.
Figure 8:
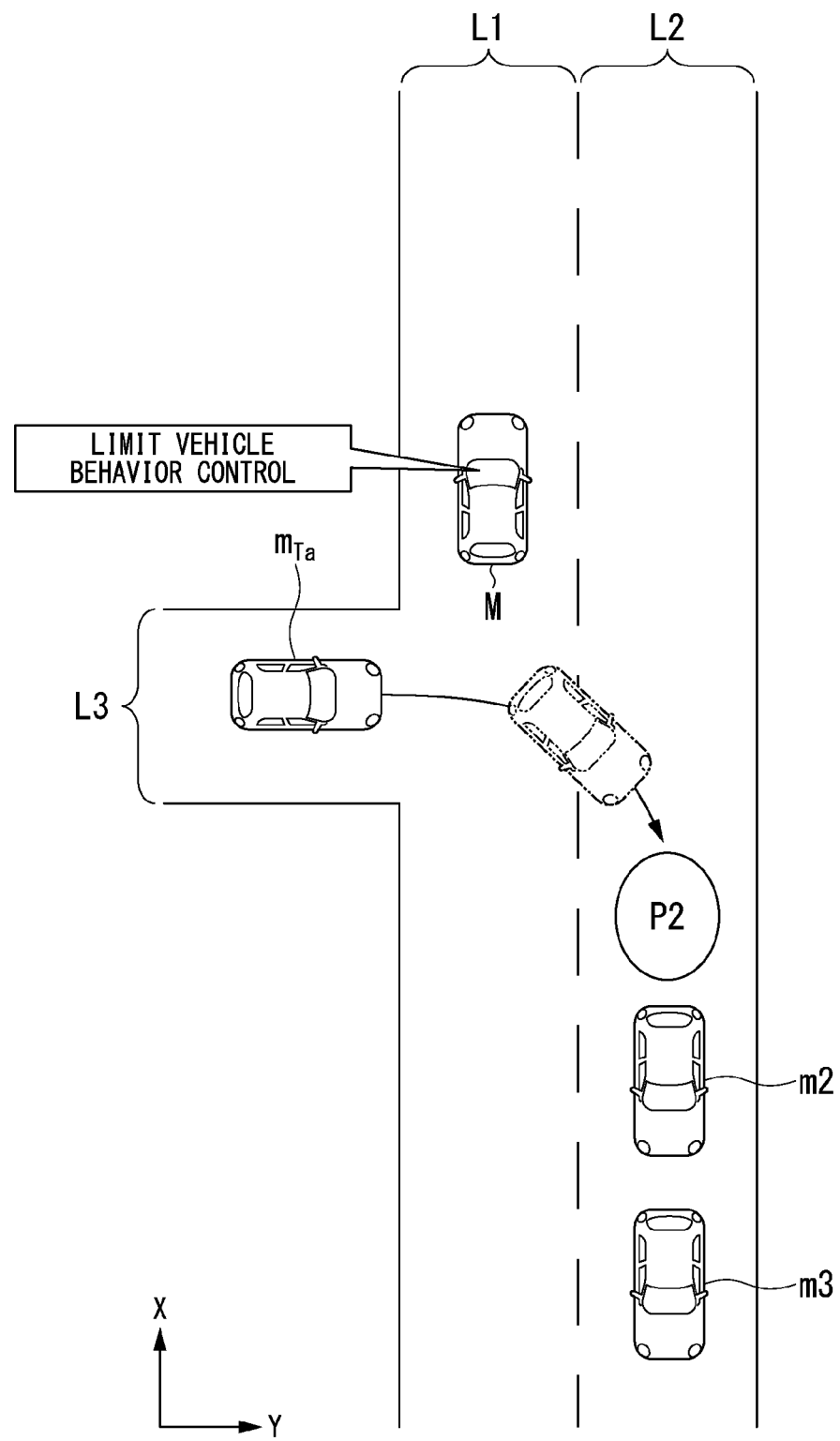
FIG. 8 is a diagram showing an example of the scene in which it is predicted that the crossing vehicle will cross the subject lane and enter the adjacent lane.

FIGS. 7 and 8 are diagrams showing an example of a scene in which it is predicted that the crossing vehicle will cross the subject lane and enter the adjacent lane. In the scene shown in FIG. 7, although there is no other vehicle in front of the subject vehicle M within the second predetermined distance $D_{THX2}$ and there is a sufficient space for the crossing vehicle $m_{Ta}$ to enter the subject lane L1, the crossing vehicle $m_{Ta}$ is stopped without entering the subject lane L1. In such a case, since a probability that the crossing vehicle $m_{Ta}$ is estimating a timing of a lane change to the adjacent lane L2 is high, as in the scene shown in FIG. 8, the predictor 146 predicts that the crossing vehicle $m_{Ta}$ will cross the subject lane L1 and enter the adjacent lane L2. In a case where it is recognized that a turn signal lamp of the right side in the progress direction of the crossing vehicle $m_{Ta}$ is being operated regardless of presence or absence of another vehicle within the second predetermined distance $D_{THX2}$, the predictor 146 may predict that the crossing vehicle $m_{Ta}$ will cross the subject lane L1 and enter the adjacent lane L2.

For example, in a case where it is predicted that the crossing vehicle $m_{Ta}$ will cross the subject lane L1 and enter the adjacent lane L2 by the predictor 146, the event determiner 142 maintains the current event without changing the current event. Therefore, the predetermined vehicle behavior control is limited (is suppressed). For example, in a case where the current event is the follow-up traveling event in which the other vehicle m1 is set as the preceding vehicle, the subject vehicle M does not decelerate or move to the adjacent lane L2 within the subject lane L1, and keeps following the other vehicle m1 that is the preceding vehicle. With such control, since the speed control or the steering control are not performed more than necessity, it is possible to improve the comfort of an occupant of the subject vehicle.

In the flowchart described above, in a case where it is predicted that there is no other vehicle in front of the subject vehicle M within the second predetermined distance $D_{THX2}$ and the crossing vehicle $m_{Ta}$ is stopped without entering the subject lane L1 by the recognizer 130, the predictor 146 predicts that the crossing vehicle $m_{Ta}$ will cross the subject lane L1 and enter the adjacent lane L2, but the present invention is not limited thereto.

For example, in a case where it is recognized that one or more other vehicles are present on the adjacent lane L2 and the crossing vehicle $m_{Ta}$ is stopped without entering the subject lane L1 by the recognizer 130, the predictor 146 may predict that the crossing vehicle $m_{Ta}$ will cross the subject lane L1 and enter the adjacent lane L2.

Figure 9:
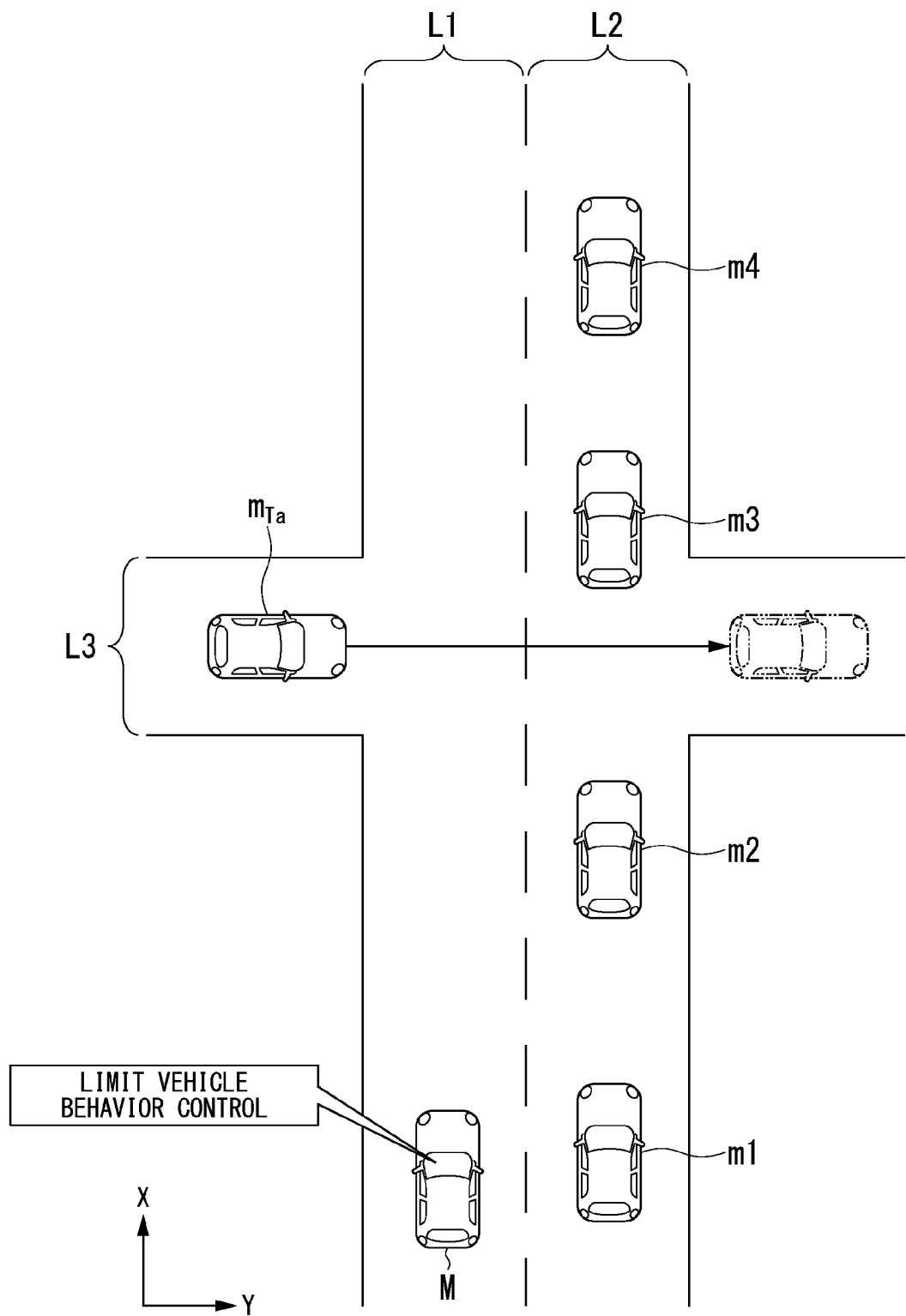
FIG. 9 is a diagram showing another example of the scene in which it is predicted that the crossing vehicle will cross the subject lane and enter the adjacent lane.

FIG. 9 is a diagram showing another example of the scene in which it is predicted that the crossing vehicle will cross the subject lane and enter the adjacent lane. In the shown example, the adjacent lane L2 is an overtaking lane (passing lane or overtaking lane) that is the same as the progress direction of the vehicle traveling on the subject lane L1. The intersecting lane L3 extends also across the priority road including the lanes L1 and L2 to an opposite side to form a crossroads.

For example, when the plurality of other vehicles m1 to m4 are present on the overtaking lane L2 and in a case where it is recognized that the crossing vehicle $m_{Ta}$ is stopped without entering the subject lane L1 by the recognizer 130, the predictor 146 predicts that the crossing vehicle $m_{Ta}$ will cross the subject lane L1 and the adjacent lane L2 in order to pass through the priority road. In such a case, the event determiner 142 limits the predetermined vehicle behavior control by maintaining the current event without changing the current event.

When the crossing vehicle $m_{Ta}$ is stopped without entering the priority road and in a case where it is recognized that there is a pedestrian crossing a priority road from the intersection of the intersecting lane L3 and a priority road to a future point of a predetermined distance destination by the recognizer 130 under a condition that there is no other vehicle in front of the subject vehicle M within the second predetermined distance $D_{THX2}$, the predictor 146 may predict that the crossing vehicle $m_{Ta}$ will enter the subject vehicle lane L1, and in a case where it is not recognized the pedestrian crossing the priority road by the recognizer 130 under the above-described condition, the predictor 146 may predict that the crossing vehicle $m_{Ta}$ will cross the subject lane L1 and enter the adjacent lane L2.

Figure 10:
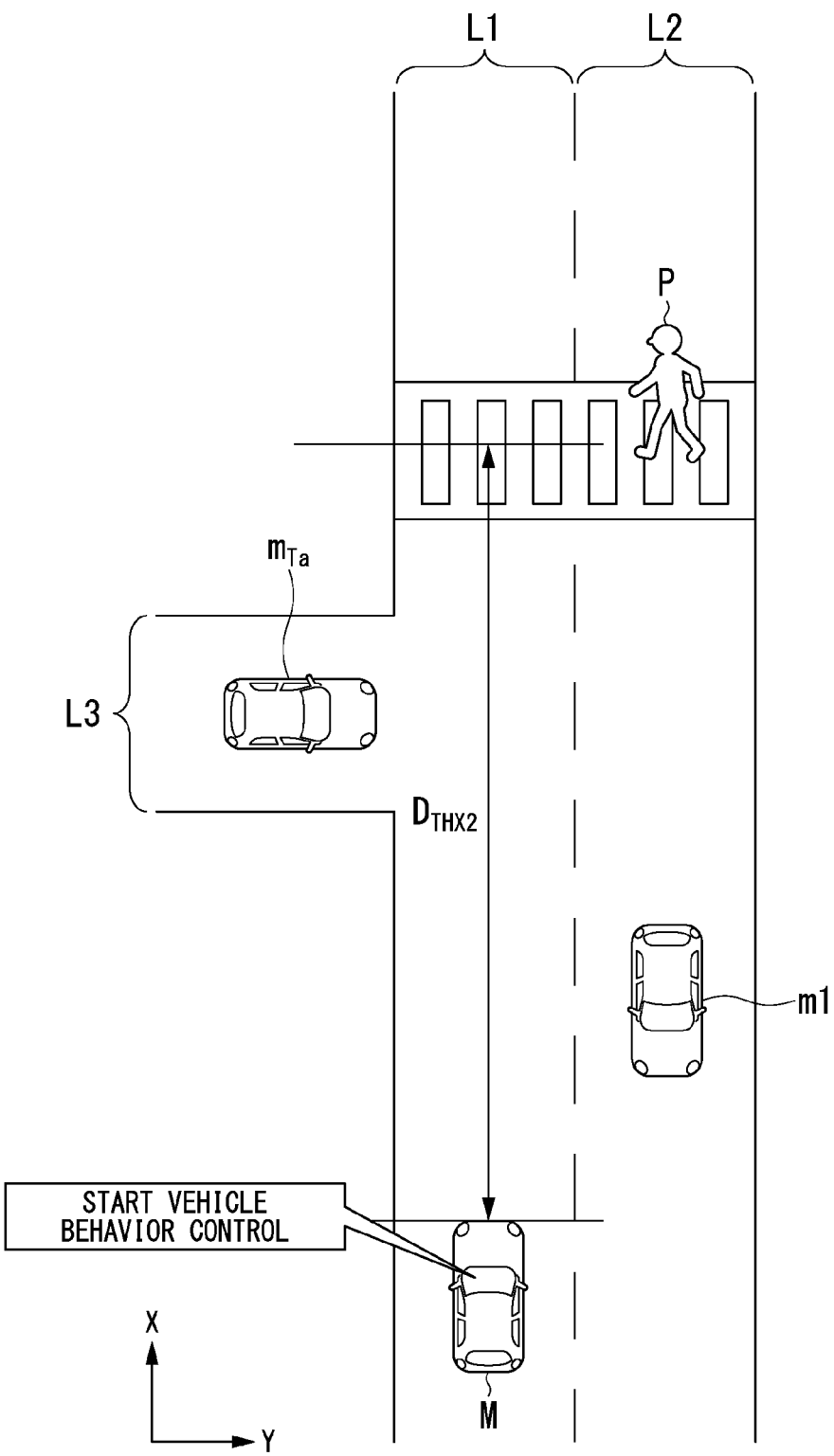
FIG. 10 is a diagram showing an example of a scene in which a pedestrian crosses a priority road.

FIG. 10 is a diagram showing an example of a scene in which the pedestrian crosses the priority road. In the shown example, there is a crosswalk further forward than the intersection between the intersecting lane L3 and the priority road as viewed from the subject vehicle M, and a pedestrian P is present on the crosswalk. In this case, the recognizer 130 recognizes the pedestrian P as a pedestrian crossing the priority road. In the shown scene, although there is no other vehicle in front of the subject lane L1 within the second predetermined distance $D_{THX2}$ and there is an enough space for the crossing vehicle $m_{Ta}$ to enter the subject lane L1, the crossing vehicle $m_{Ta}$ is stopped without entering the subject lane L1. Under such circumstances, there is a possibility that the crossing vehicle $m_{Ta}$ may stop to wait for the pedestrian to finish crossing the priority road, and an occurrence probability of an event that the crossing vehicle $m_{Ta}$ enters the subject lane L1 and an occurrence probability of an event that the crossing vehicle $m_{Ta}$ crosses the subject lane L1 and enters the adjacent lane L2 are able to be about the same. In this case, the predictor 146 predicts that the crossing vehicle $m_{Ta}$ will enter the subject lane L1 by preferentially considering that the crossing vehicle $m_{Ta}$ enters the subject vehicle lane L1. Therefore, the automatic driving control device 100 performs the predetermined vehicle behavior control.

On the other hand, in a case where although the pedestrian P crosses the crosswalk and the pedestrian P is not present on the priority road and the crossing vehicle $m_{Ta}$ is stopped without entering the subject lane L1, the predictor 146 may predict that the crossing vehicle $m_{Ta}$ will cross the subject vehicle lane L1 and enter the adjacent lane L2. Therefore, the automatic driving control device 100 limits the predetermined vehicle behavior control.

When the crossing vehicle $m_{Ta}$ is stopped without entering the priority road and in a case where it is recognized that an intersection is present from the intersection of the intersecting lane L3 and the priority road to a future reach point of the predetermined distance destination by the recognizer 130 under a condition that there is no other vehicle in front of the subject vehicle M within the second predetermined distance $D_{THX2}$, the predictor 146 may predict that the crossing vehicle $m_{Ta}$ will cross the subject lane L1 and enter the adjacent lane L2, and in a case where it is not recognized that the intersection is present from the intersection of the intersecting lane L3 and the priority road to the future reach point of the predetermined distance destination by the recognizer 130 under the condition described above, the predictor 146 may predict that the crossing vehicle $m_{Ta}$ will enter the subject vehicle lane L1.

Figure 11:
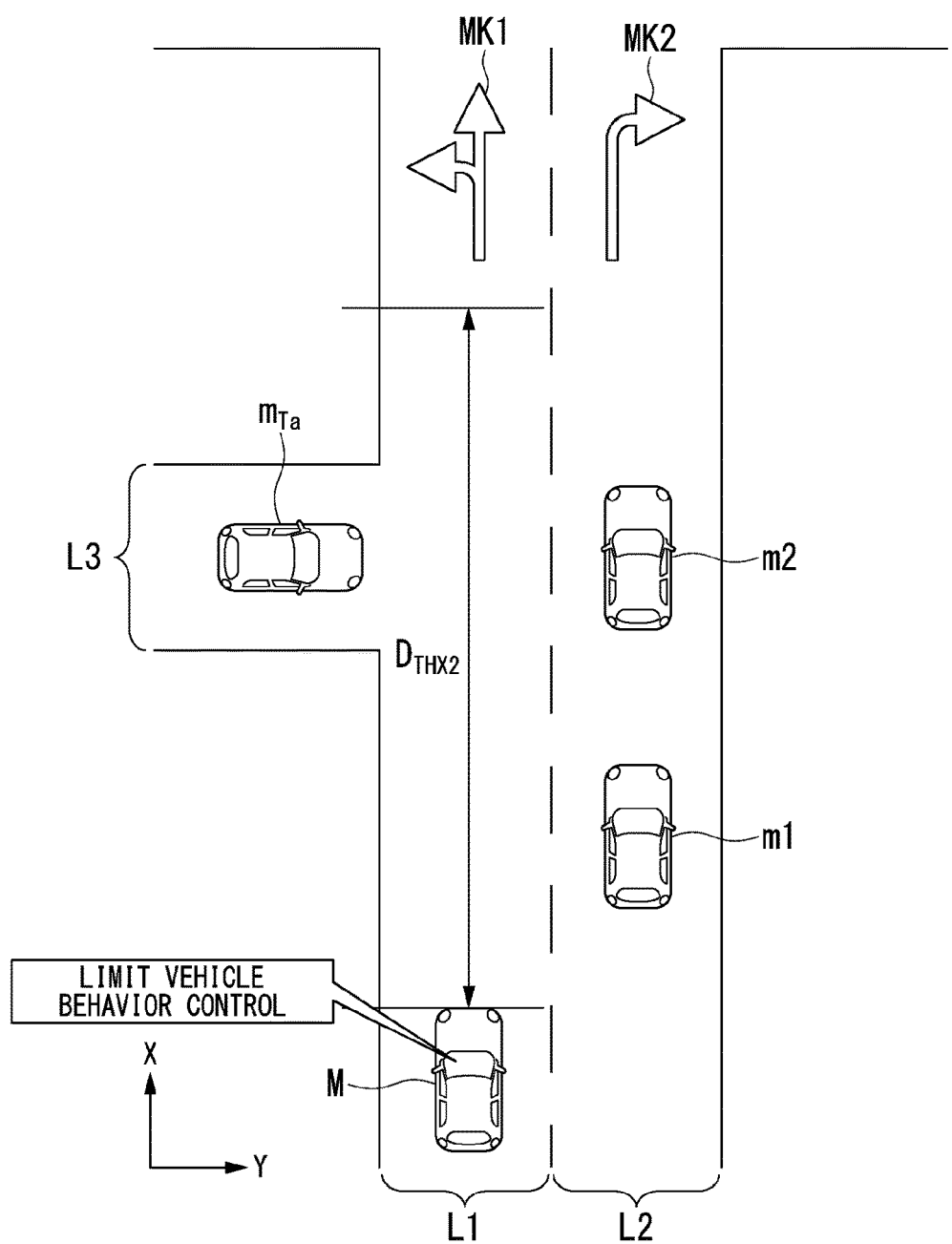
FIG. 11 is a diagram showing an example of a scene in which an intersection is present beyond the intersection of an intersecting lane and the priority road.

FIG. 11 is a diagram showing an example of a scene in which an intersection is present beyond the intersection of the intersecting lane L3 and the priority road. The adjacent lane L2 represents an overtaking lane in which the progress direction of the vehicle traveling on the subject lane L1 is the same. A road marking MK1 represents a direction in which the vehicle traveling on the lane L1 is able to progress, and a road marking MK2 represents a direction in which the vehicle traveling on the lane L2 is able to progress. In the shown example, the road marking MK1 indicates a direction in which only going straight or turning left is able to be progressed, and the road marking MK2 indicates a direction in which only turning right is able to be progressed. The intersection at which the road marking MK2 is present is an example of a "predetermined point".

As shown in the figure, in a case where even though there is no other vehicle in front of the subject vehicle M of the subject lane L1 within the second predetermined distance $D_{THX2}$ and the crossing vehicle $m_{Ta}$ stops without entering the priority road, the predictor 146 predicts that the crossing vehicle $m_{Ta}$ will cross the subject lane L1 and enter the overtaking lane L2 in order to turn right at the intersection in a case where the road marking MK2 indicating a right turn progress is present in the vicinity of the intersection. Therefore, the automatic driving control device 100 limits the predetermined vehicle behavior control.

In the embodiment described above, the vehicle that is parked in the parking lot facing the road including the subject lane or the vehicle that enters from another lane that crosses the road including the subject lane is described as the crossing vehicle $m_{Ta}$, but the present invention is not limited thereto. For example, the crossing vehicle $m_{Ta}$ may be another vehicle that interrupts the subject lane from the adjacent lane during a traffic jam.

Figure 12:
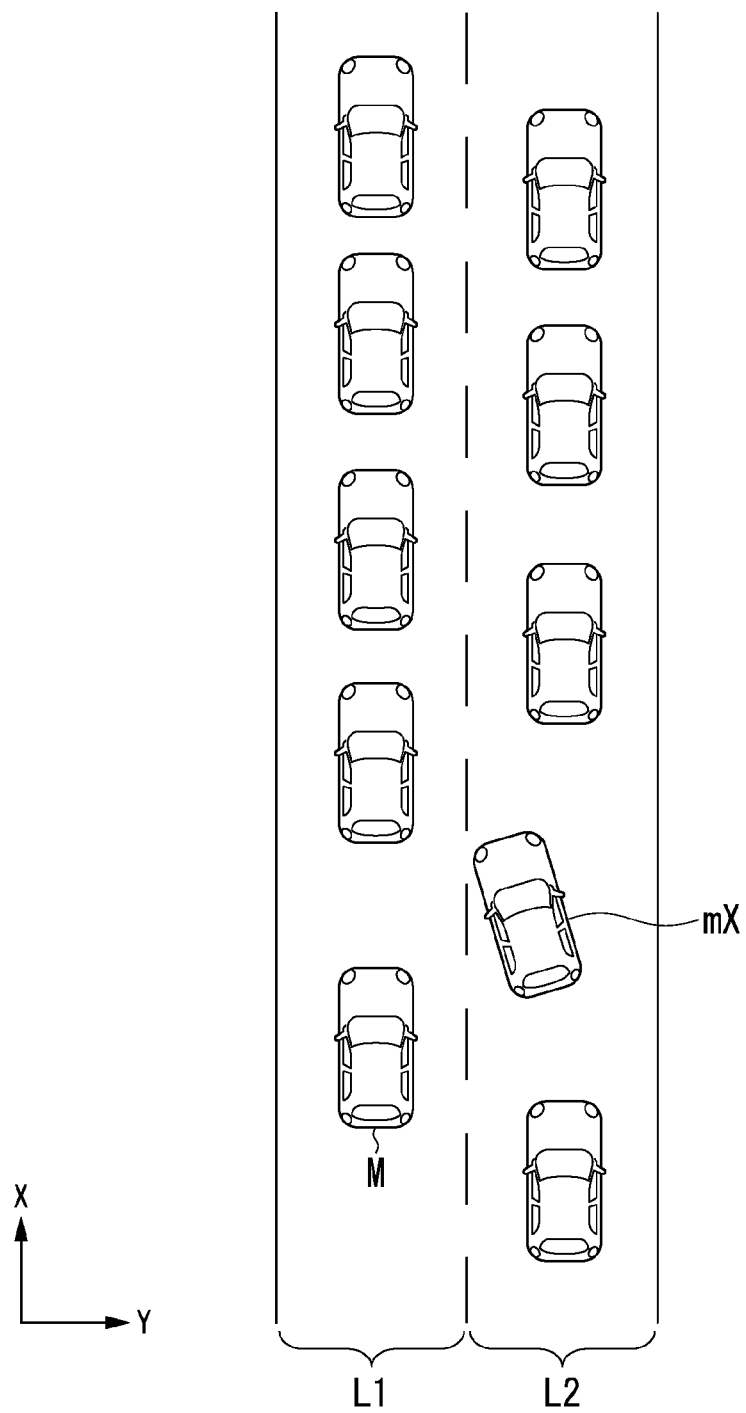
FIG. 12 is a diagram showing an example of a scene in which a road is congested.

FIG. 12 is a diagram showing an example of a scene in which the road is congested. As shown in the figure, in a case where a certain other vehicle mX traveling on the adjacent lane L2 is attempt to interrupt the subject lane L1, since a progress direction of the other vehicle mX crosses the progress direction of the subject vehicle M, the predictor 146 regards the other vehicle mX as the crossing vehicle $m_{Ta}$ and predicts whether or not the other vehicle mX crosses the subject lane on which the subject vehicle M is present. Therefore, it is possible to hand over the subject lane L1 to the other vehicle mX during the traffic jam while maintaining the comfort of the occupant.

According to the first embodiment described above, it is possible to recognize the object in the vicinity of the subject vehicle M, and in a case where the crossing vehicle $m_{Ta}$ that is present at the position (for example, a cross road crossing the subject lane) at which the crossing vehicle $m_{Ta}$ is able to cross the subject lane is recognized, it is possible to generate the target trajectory for performing the predetermined vehicle behavior control, and it is possible to control at least one of the speed or the steering of the subject vehicle M on the basis of the generated target trajectory to perform the predetermined vehicle behavior control. In addition, in a case where the crossing vehicle $m_{Ta}$ stops even though the crossing vehicle $m_{Ta}$ is able to enter the subject lane, it is possible to predict that the crossing vehicle $m_{Ta}$ will cross the subject lane on which the subject vehicle M is present on the basis of the recognition result of the object. In addition, in a case where it is predicted that the crossing vehicle $m_{Ta}$ will cross the subject lane before the subject vehicle M moves to the front of the crossing vehicle $m_{Ta}$, it becomes difficult to perform unnecessary deceleration to limits the predetermined vehicle behavior control, and it is possible to perform the automatic driving according to a trend of a surrounding vehicle while improving the comport of the occupant.

According to the first embodiment described above, in a case where it is predicted that the crossing vehicle $m_{Ta}$ will cross the subject lane, it is possible to omit various processes in order to limits the predetermined vehicle behavior control.

According to the first embodiment described above, for example, in a case where a sum of probabilities of occurrences of all events that are able to be predicted by the predictor 146 is 1, when it is predicted that the crossing vehicle $m_{Ta}$ will cross the subject lane, since a probability of an occurrence of another event (for example, an event in which the crossing vehicle $m_{Ta}$ enters the subject lane) is relatively increased with respect to a probability of an occurrence of an event in which the crossing vehicle $m_{Ta}$ crosses the subject lane, it is possible to improve reliability of a prediction result of the occurrence of the other event.

Second Embodiment

Hereinafter, a second embodiment will be described. The second embodiment is different from the above-described first embodiment in that a degree of recognition by the recognizer 130 is changed in a case where it is predicted that the crossing vehicle $m_{Ta}$ will cross the subject lane. The degree of recognition is a degree of recognition accuracy of an object. Hereinafter, the difference from the first embodiment will be mainly described, and descriptions of functions and the like in common with the first embodiment will be omitted.

In the second embodiment, for example, in a case where it is predicted that the crossing vehicle $m_{Ta}$ will cross the subject lane by the predictor 146, the recognizer 130 according to the second embodiment increases the degree of recognition of the object of another lane different from the subject lane (for example, the adjacent lane) as compared with a case where it is predicted that the crossing vehicle $m_{Ta}$ will not cross the subject lane and enter the subject lane. More specifically, in a case where the recognizer 130 repeatedly performs the recognition process for the adjacent lane at a predetermined period, when it is predicted that the crossing vehicle $m_{Ta}$ will cross the subject lane, the recognizer 130 shortens the period and repeats the recognition process. Therefore, the recognizer 130 is able to more accurately recognize a state such as a position, a speed, or the like of the object that is able to be present in the adjacent lane.

According to the second embodiment described above, in a case where it is predicted that the crossing vehicle $m_{Ta}$ will cross the subject lane, since the degree of recognition by the recognizer 130 is changed, it is possible to more accurately recognize a state such as a position, a speed, or the like of the object that is able to be present in the adjacent lane. As a result, the predictor 146 is able to accurately predict whether the crossing vehicle $m_{Ta}$ will cross the subject lane or enter the subject lane without crossing the subject lane, on the basis of the state of the other vehicle on the adjacent lane that is accurately recognized.

[Hardware Constitution]

Figure 13:
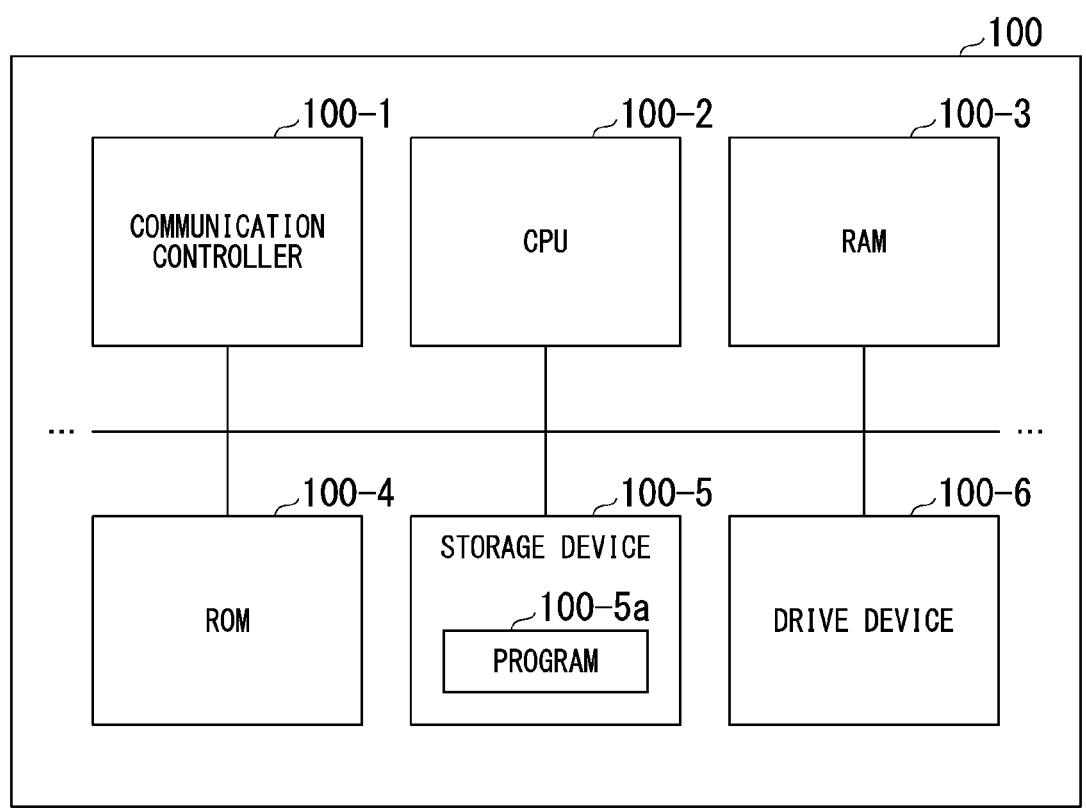
FIG. 13 is a diagram showing an example of a hardware constitution of an automatic driving control device according to an embodiment.

FIG. 13 is a diagram showing an example of a hardware constitution of the automatic driving control device 100 according to an embodiment. As shown in the figure, the automatic driving control device 100 includes a constitution in which a communication controller 100-1, a CPU 100-2, a RAM 100-3 used as a working memory, a ROM 100-4 storing a boot program and the like, a storage device 100-5 such as a flash memory or a HDD, a drive device 100-6 and the like are mutually connected by an internal bus or a dedicated communication line. The communication controller 100-1 communicates with components other than the automatic driving control device 100. A program 100-5a executed by the CPU 100-2 is stored in the storage device 100-5. This program is developed in the RAM 100-3 by a direct memory access (DMA) controller (not shown) or the like and executed by the CPU 100-2. Therefore, a part or all of the first controller 120 and the second controller 160 are realized.

The above-described embodiment is able to be expressed as follows.

A vehicle control device including:
a storage that stores a program; and
a processor,
wherein the processor executes the program to:
recognize an object around a subject vehicle;
control at least one of a speed and steering of the subject vehicle based on a position of the recognized object;
predict that a predetermined vehicle will move to a front of the subject vehicle on a subject lane, in a case where the predetermined vehicle that is present at a position at which the predetermined vehicle is able to cross the subject lane on which the subject vehicle is present is recognized;
perform predetermined vehicle behavior control in preparation for an entry of the predetermined vehicle to the subject lane in a case where it is predicted that the predetermined vehicle will move to the front of the subject vehicle on the subject lane, in a case where the predetermined vehicle is recognized; and
limit the predetermined vehicle behavior control in a case where it is predicted that the predetermined vehicle does not move to the front of the subject vehicle on the subject lane as compared with a case where it is predicted that the predetermined vehicle will move to the front of the subject vehicle on the subject lane in a case where the predetermined vehicle is recognized.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a processor; and
a memory communicatively coupled to the processor, the memory having stored therein computer-executable components, the computer-executable components comprising:
a recognizer that recognizes an object around a subject vehicle;
a driving controller that controls at least one of a speed and steering of the subject vehicle based on a position of the object recognized by the recognizer; and
a predictor that predicts whether a predetermined vehicle will move to a front of the subject vehicle on a subject lane in response to the recognizer recognizing whether the predetermined vehicle is present at a position at which the predetermined vehicle is able to cross the subject lane on which the subject vehicle is present,
wherein, the driving controller performs a predetermined vehicle behavior control in preparation for an entry of the predetermined vehicle to the subject lane in response to a prediction by the predictor that the predetermined vehicle will move to the front of the subject vehicle on the subject lane and a recognition of the predetermined vehicle by the recognizer,
the driving controller limits the predetermined vehicle behavior control in response to a prediction by the predictor that the predetermined vehicle does not move to the front of the subject vehicle on the subject lane by the predictor and the recognition of the predetermined vehicle by the recognizer, and
the predictor predicts whether the predetermined vehicle will move in front of the subject vehicle on the subject lane based on at least one of (i) presence or absence of another vehicle within a predetermined distance in front of the subject vehicle, (ii) presence or absence of an operation of a turn signal lamp provided in the predetermined vehicle, (iii) presence or absence of an adjacent lane that is adjacent to the subject lane, or (iv) presence or absence of a predetermined point is present for changing the progress direction of the vehicle according to a road structure,
wherein, in response to the prediction by the predictor that the predetermined vehicle will move to the front of the subject vehicle on the subject lane, the recognizer increases a degree of recognition accuracy of an object of a lane different from the subject lane.

2. The vehicle control device of claim 1,
wherein the subject vehicle is traveling in a direction that intersects with a direction of travel of the predetermined vehicle.

3. The vehicle control device of claim 1,
wherein, in response to a prediction by the predictor that the predetermined vehicle will move to the front of the subject vehicle on the subject lane before the predetermined vehicle is present in the front of the subject vehicle and the subject vehicle will move in front of the predetermined vehicle, the driving controller performs the predetermined vehicle behavior control.

4. The vehicle control device of claim 1,
wherein, in response to the recognizer not recognizing that another vehicle is present within a predetermined distance in front of the subject vehicle and that the predetermined vehicle will not enter the subject lane and stop, the predictor predicts that the predetermined vehicle will not move in front of the subject vehicle on the subject lane.

5. The vehicle control device of claim 1,
wherein the recognizer recognizes presence or absence of an operation of a turn signal lamp provided in the predetermined vehicle, and
the predictor predicts whether the predetermined vehicle will move to the front of the subject vehicle on the subject lane according to the recognized presence or absence of the operation of the turn signal lamp.

6. The vehicle control device of claim 5,
wherein, in response to the recognizer recognizing operation of a turn signal lamp on a side close to the subject vehicle among a plurality of turn signal lamps provided in the predetermined vehicle, the predictor predicts that the predetermined vehicle will move to the front of the subject vehicle on the subject lane.

7. The vehicle control device of claim 1,
wherein the recognizer recognizes a plurality of lanes including the subject lane, and
in response to the recognizer recognizing the plurality of lanes and not recognizing another vehicle within a predetermined distance in front of the subject vehicle on the subject, the predictor predicts that the predetermined vehicle will move to the front of the subject vehicle on the subject lane in response to the predetermined vehicle not entering the subject lane.

8. The vehicle control device of claim 1,
wherein the recognizer recognizes a plurality of lanes including the subject lane and an adjacent lane that is adjacent to the subject lane, and
in response to the recognizer recognizing the adjacent lane that one or more other vehicles are present on the adjacent lane, the predictor predicts whether the predetermined vehicle will move to the subject lane and enter the adjacent lane.

9. The vehicle control device of claim 8,
wherein the recognizer recognizes whether a predetermined point is present for changing the progress direction of the vehicle according to a road structure, and
in response to the recognizer recognizing that the predetermined point is present in front of the position at which the predetermined vehicle is able to cross the subject lane on which the subject vehicle is present, the predictor predicts that the predetermined vehicle will move to the subject lane and enter the adjacent lane.

10. The vehicle control device of claim 1,
wherein the recognizer recognizes whether a pedestrian is present, and
in response to the recognizer recognizing that the pedestrian is present in front of the position at which the pedestrian is able to cross the subject lane on which the subject vehicle is present, the predictor predicts whether the predetermined vehicle will move to the front of the subject vehicle on the subject lane.

11. A vehicle control device comprising:
a processor; and
a memory communicatively coupled to the processor, the memory having stored therein computer-executable components, the computer-executable components comprising:
a recognizer that recognizes an object around a subject vehicle;
a driving controller that controls at least one of a speed and steering of the subject vehicle based on a position of the object recognized by the recognizer; and
a predictor that predicts whether a predetermined vehicle will move to a front of the subject vehicle on a subject lane in response to the recognizer recognizing whether the predetermined vehicle is present at a position at which the predetermined vehicle is able to cross the subject lane on which the subject vehicle is present,
wherein, in response to a prediction by the predictor that the predetermined vehicle will move to the front of the subject vehicle on the subject lane in a case where the recognizer recognizes the predetermined vehicle, the recognizer is configured to increase a degree of recognition accuracy of an object of a lane different from the subject lane, and
the recognizer increases the degree of recognition accuracy based on at least one of (i) presence or absence of another vehicle within a predetermined distance in front of the subject vehicle, (ii) presence or absence of an operation of a turn signal lamp provided in the predetermined vehicle, (iii) presence or absence of an adjacent lane that is adjacent to the subject lane, or (iv) presence or absence of a predetermined point is present for changing the progress direction of the vehicle according to a road structure,
wherein, in response to the prediction by the predictor that the predetermined vehicle will move to the front of the subject vehicle on the subject lane, the recognizer increases a degree of recognition accuracy of an object of a lane different from the subject lane.

12. A vehicle control method that causes an in-vehicle computer to:
recognize an object around a subject vehicle;
control at least one of a speed and steering of the subject vehicle based on a position of the recognized object;
predict whether a predetermined vehicle will move to a front of the subject vehicle on a subject lane, in response to a recognition whether the predetermined vehicle is present at a position at which the predetermined vehicle is able to cross the subject lane on which the subject vehicle is present;
perform a predetermined vehicle behavior control in preparation for an entry of the predetermined vehicle to the subject lane in response to a prediction that the predetermined vehicle will move to the front of the subject vehicle on the subject lane and recognizing the predetermined vehicle;
limit the predetermined vehicle behavior control in response to a prediction that the predetermined vehicle will not move to the front of the subject vehicle on the subject lane; and
predict whether the predetermined vehicle will move in front of the subject vehicle on the subject lane based on at least one of (i) presence or absence of another vehicle within a predetermined distance in front of the subject vehicle, (ii) presence or absence of an operation of a turn signal lamp provided in the predetermined vehicle, (iii) presence or absence of an adjacent lane that is adjacent to the subject lane, or (iv) presence or absence of a predetermined point is present for changing the progress direction of the vehicle according to a road structure,
wherein, in response to the prediction that the predetermined vehicle will move to the front of the subject vehicle on the subject lane, increase a degree of recognition accuracy of an object of a lane different from the subject lane.

13. A computer-readable non-transitory storage medium storing a program that causes an in-vehicle computer to execute:
a process of recognizing an object around a subject vehicle;
a process of controlling at least one of a speed and steering of the subject vehicle based on a position of the recognized object;
a process of predicting whether a predetermined vehicle will move to a front of the subject vehicle on a subject lane in response to recognizing whether the predetermined vehicle is present at a position at which the predetermined vehicle is able to cross the subject lane on which the subject vehicle is present;
a process of performing a predetermined vehicle behavior control in preparation for an entry of the predetermined vehicle to the subject lane in response to a prediction that the predetermined vehicle will move to the front of the subject vehicle on the subject lane and recognition of the predetermined vehicle;
a process of limiting the predetermined vehicle behavior control in response to a prediction that the predetermined vehicle will not move to the front of the subject vehicle on the subject lane; and
a process of predicting whether the predetermined vehicle will move in front of the subject vehicle on the subject lane based on at least one of (i) presence or absence of another vehicle within a predetermined distance in front of the subject vehicle, (ii) presence or absence of an operation of a turn signal lamp provided in the predetermined vehicle, (iii) presence or absence of an adjacent lane that is adjacent to the subject lane, or (iv) presence or absence of a predetermined point is present for changing the progress direction of the vehicle according to a road structure,
wherein, in response to predicting that the predetermined vehicle will move to the front of the subject vehicle on the subject lane, increasing a degree of recognition accuracy of an object of a lane different from the subject lane.

* * * * *